(12) United States Patent
Mezard et al.

(10) Patent No.: US 7,036,720 B2
(45) Date of Patent: May 2, 2006

(54) METHOD AND APPARATUS FOR RESOLUTION OF PROBLEMS USING CONSTRAINED DISCRETE VARIABLES

(75) Inventors: Marc Mezard, Gif sur Yvette (FR); Riccardo Zecchina, Trieste (IT)

(73) Assignees: Centre National de la Recherche Scientifique (CNRS), Paris (FR); Universite Paris Sud (Paris XI), Orsay (FR); Abdus Saleam International Centre for Theoretical Physics, Trieste (IT)

( * ) Notice: Subject to any disclaimer, the term of this patent is extended or adjusted under 35 U.S.C. 154(b) by 151 days.

(21) Appl. No.: 10/606,275

(22) Filed: Jun. 25, 2003

(65) Prior Publication Data

US 2004/0262376 A1 Dec. 30, 2004

(51) Int. Cl.
*G06F 17/00* (2006.01)
(52) U.S. Cl. .......................................... 235/375; 700/28
(58) Field of Classification Search ................. 235/375; 700/28
See application file for complete search history.

(56) References Cited

U.S. PATENT DOCUMENTS

2003/0083756 A1 * 5/2003 Hsiung et al. ................ 700/28

OTHER PUBLICATIONS

Braunstein et al., "Survey propagation: an algorithm for satisfiability," preprint, www.ictp.triest.it/zecchina/SP, 2002.
Mézard et al., "Analytic and algorithmic solugion of random satisfiability problems," *Science*, 297:812-814, 2002.
Mézard and Zecchina, "The random K-satisfiability problem: from an analytic solution to an efficient algorithm," *Phys. Rev.* E66, 056126, 2002.

* cited by examiner

*Primary Examiner*—Karl D. Frech
(74) *Attorney, Agent, or Firm*—Fulbright & Jaworski LLP

(57) ABSTRACT

Calculator based resolution method and device for an optimization problem of the physical real world, the problem being modeled with constrained discrete variables, the variables having a referenced set of possible states. The method comprising, a survey propagation step and a survey induced decimation step to provide a simplified problem, until all variables are either assigned or are unpolarized.

42 Claims, 6 Drawing Sheets

Figure 1:
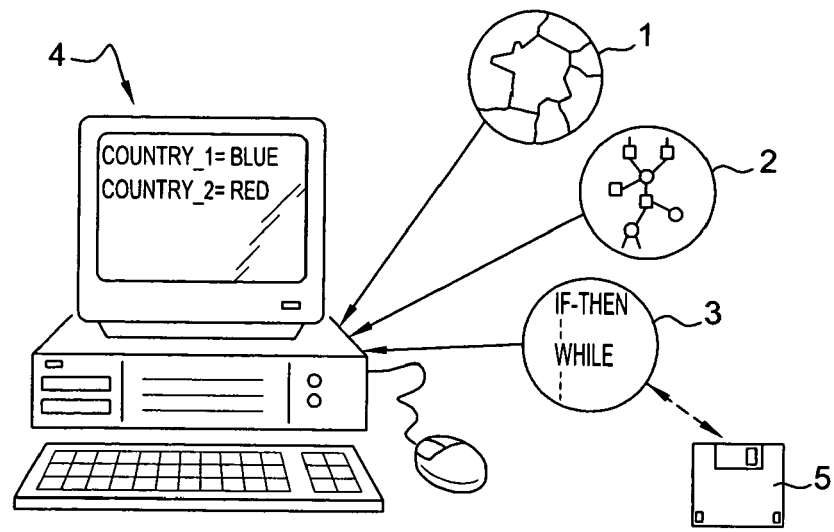

| Cavity-bias | Cavity-bias-survey a->x | Cavity-bias-survey b->x |
|---|---|---|
| ☐☐ | p=0 | p=0 |
| ⊠☐ | p=.6 | p=0 |
| ☐⊠ | p=0 | p=.7 |
| ⊠⊠ | p=.4 | p=.3 |

Cavity-field-survey x->c:

p=0
 p=0
 p=.6*.3
->C*.6*.3*f[1]

p=0
 p=0
 p=.4*.7
->C*.4*.7*f[1]

p=0
 p=.6*.7
->C*.6*.7*f[1]
 p=.4*.3
->C*.4*.3*f[2]

$$C = \frac{1}{(.6*.7*f[1]+.7*.3*f[1]+.4*.7*f[1]+.4*.3*f[2])}$$

METHOD AND APPARATUS FOR RESOLUTION OF PROBLEMS USING CONSTRAINED DISCRETE VARIABLES

The present invention relates generally to calculator implemented method of resolution of problems which can be modeled as sets of variables with a limited range of possible values, i.e. discrete variables, and which are constrained on their possible values by constraint functions. A related device and a calculator readable media bearing instructions are also considered.

Real world optimization problems are often described in terms of a cost function, which has to be minimized over a large set of discrete independent variables. Some of these variables might not be under control, in which case the optimization task is called "optimization under uncertainty". Quite in general, costs function can be written as a list of constraints over the discrete variables and the optimization task consists in finding assignments of the discrete variables, which minimize the number of violated constraints. A typical example of such problem is the graph Coloring problem: given a graph, one wants to find the minimal number of colors which are needed to color the vertexes in such a way that two vertexes connected by a link never take the same color. A familiar realization of graph coloring is the problem of coloring maps: countries sharing a border have to be colored in different colors.

Another classical problem of constraint satisfaction is the satisfiability of conjunctive normal forms: the variables are Boolean variables, which have to be assigned a value: true (T) of false (F). A literal is defined as either the variable itself, or its negation. Each constraint consists of the 'or' of a certain number of literals. For instance one could have 3 variables x,y,z, and the following five constraints:

a) x.or.(not y)
b) (not x).or.z
c) (not y).or.(not z)
d) y.or.(not z)
e) x.or.y.or.(not z)

In order to satisfy constraint a), one needs to assign the variable x to true, or to assign the variable y to false, or both. The problem is to find an assignment of all three variables which satisfies all constraints (this is called a SAT assignment). In the present example assigning x to false, y to false, z to false is a SAT assignment.

The satisfiability of conjunctive normal forms is a core problem of computer science, because many other problems can be transformed into it: a theorem by S. A. Cook ("The complexity of theorem-proving procedures", Proceedings of the $3^{rd}$ annual ACM Symposium on the theory of computing, p151, 1971) shows that all the problems which can be solved in polynomial time by a non-deterministic Turing machine can be transformed into satisfiability. Any progress on statisfiability has thus potential impact for resolution of all these problems.

Some methods for such problems have already been proposed. Systematic search procedures can be improved with respect to the naïve enumeration of all possible assignments. One of the best such procedure is the Davis-Putnam algorithm which is very much used. However, in difficult constraint satisfaction problems, the number of assignments which is typically explored by this algorithm grows exponentially with the size of the problem, and its use is limited to problems involving a relatively small number of variables. Alternative methods consist of heuristics which aim at finding an assignment of all variables by exploring a much smaller set of assignments (with the risk of not finding an existing solution). The most widely used heuristics so far are local search methods in which one starts from some initial assignment, which generally violates some constraint, and one tries to reduce the number of violated constraints by changing the value assigned to one variable. The GSAT procedure (Selman, B.; Levesque, H.; Mitchell, D. GSAT— "A New Method for Solving Hard Satisfiability Problems". Proceedings AAAI-92.) or the WalkSAT procedure (Selman, B.; Kautz, H.; Cohen, B.—"Local Search Strategies for Satisfiability Testing". Proceedings of 2nd DIMACS Challenge on Cliques, Coloring and Satisfiability, 1994.), are among the best existing such procedures for satisfiability problems. Another class of local search procedure is the simulated annealing method (S. Kirkpatrick, C. D. Gelatt, M. P. Vecchi, "Optimization by simulated annealing", Science, vol 220, p 621, 1983). All these local search methods can often deal with problems involving many more variables than exhaustive searches; however in difficult problems they tend to be trapped into 'local minima' which can prevent them from finding a satisfiable assignment, or slow down the procedure to a point where it becomes useless. A local minimum is an assignment of variables violating some constraints, such that one cannot decrease the number of violated constraints by a sequence of moves in which one changes the assignment of only one, or a small number, of variables. The present procedure is a heuristic method which does not rely on local optimization, and can thus avoid these local minima.

The proposed solution is based on a relatively simple method which is applied iteratively on a data structure representing the problem as a graph of the variables and their constraints and in which messages are exchanged. The method uses an iterative message passing procedure. The messages, which are sent along a graph describing the variables and the constraints, are probability distributions of the bias that each given constraint produces onto each variable. The procedure lends itself to numerical simulation. After convergence, it allows to detect the most biased variables and fix them; the smaller set of variables can be studied recursively by the same procedure until all variables are fixed The invention is then a calculator based resolution method for an optimization problem of the physical real world, the problem being modeled with constrained discrete variables, the variables having a referenced set of possible states.

According to the process, it comprises three proceeding steps:

(a) a first one called survey propagation in which a graph of the problem and warnings are determined, a warning giving information on whether the various assignments of the related variable are compatible with the constraints involving this variable, and in that messages are exchanged within the graph in order to determine, for each constraint and each variable involved in this constraint, a message sent from the constraint to the variable containing a set of probabilities for the various patterns of warnings that the variable can receive, (b) a second one called survey induced decimation in which, using the previous messages, a degree of polarization of each variable is determined, a degree of polarization for a variable being computed by first establishing a list of numbers, each one giving how favorable it is to assign the variable to one state of its set of possible states, each of these numbers being computed from the probability of warnings determined in the previous messages, the list being used to compute the degree of polarization by determining to what degree the most favorable assignment in the list is better than all other possible assignments, and at least one of the variables is assigned one state of its set of possible states according to its degree of polarization as to simplify the problem, (c) finally, an iteration step for restarting at step (a) with the new simplified problem till all variables are either assigned or are unpolarized.

Following means, alone or in all their possible technical combination, are considered:

in case not all the variable are assigned at the end of the three steps, a local search procedure such as a greedy search or a walksat procedure or a simulated annealing procedure is initiated in order to resolve the remaining set of unpolarized variables and their constraints, in the survey induced decimation step (b), only the variable of largest degree of polarization is assigned to the corresponding state, the method comprises the steps of:

(a) for survey propagation:

determining from the modelisation of the problem an interaction graph with edges linking nodes, the nodes being the variables, S1, S2, S3 . . . , and the constraints, a, b, c, d . . . , a variable node being connected by an edge to its related constraint(s), the interaction graph being bipartite, a variable being connected only to constraints, a constraint being connected only to variables, and for each constraint which is linked to a variable, updating the graph by:

determining over the graph, first a list of elementary messages called cavity-bias sent from each constraint to its related variable, the cavity bias being a message having a number of binary items equal to the number of possible states of the variable to which it is sent, each binary item being either void or non-void, the void corresponding to an absence of constraint on the corresponding state of the variable and the non-void corresponding to the reverse, the cavity biases being initialized to random values, determining over the graph, a list of second elementary messages called cavity-fields sent from each variable to its related constraints, the cavity-field being a message having a number of integer items equal to the number of possible states of the variable which sends it, each integer item value being the number of non-void received from all cavity-biases to said variable for the referenced possible state of the said variable, determining over the graph, a list of local-fields which are sets of integer values in relation to variables, each local-field being a set having a number of integer values equal to the number of possible states of the variable and each integer value being the number of non-void received by the variable in cavity-biases for each possible state of the variable, the cavity-bias sent from a constraint a to a variable S being computed on the constraint a from the cavity-field(s) received by said constraint a from all the other variables to which said constraint a is linked, thus excluding S, and, for each of said cavity-fields, the least penalized subspace of possible states of the variable is determined as being a set of the references of possible states for which the number of non-void is minimal, then a truth table restricted to said sets for all said cavity-fields and for all the references of possible sates for the variable S is created in relation to the constrain a, from this restricted truth table a void is assigned in the cavity-bias for the referenced possible state of the variable S if the constraint is satisfied and a non-void if the constraint is not satisfied, determining over the graph, probability laws of each cavity-bias sent from a constraint a to a linked variable S with q possible states and called cavity-bias-surveys, a cavity-bias-survey being a set of $2^q$ probabilities for each possible configuration of its cavity-bias, determining over the graph, probability laws of each cavity-field sent from a variable S to a linked constraint a and called cavity-field-surveys, a cavity-field-survey being a set of probabilities for each admissible configuration of its cavity-field, an admissible configuration of cavity-field being one with at least one void, the cavity-bias-survey sent from a constraint a to a variable S being computed on the constraint a from the cavity-field-survey(s) received by said constraint a from all the other variables to which said constraint a is linked, thus excluding S, by using a look-up table characterizing constraint a, said look-up table being a list giving, for each possible assignment of all variables participating to the constraint, whether the constraint is satisfied by the assignment or not, and computing the probability that the constraint is unsatisfied, for each state of the variable, previous survey propagation steps updates being run successively on the constraints and variables along the graph, said updates being stopped after a predetermined number of updates if it is not possible to find a set of cavity-bias-surveys which does not change, when one round of updates on all constraints and on all variables participating to the constraints is performed within a given preassigned resolution and, then, being restarted from the beginning with cavity biases initialized to new random values, (b) for survey Induced Decimation:

determining over the graph, a local-field-survey for each variable which is a probability law of all possible local-field by computing for each variable S from all the cavity-bias-surveys received by said variable and for each possible state of said variable the joint probability of each admissible local-filed, an admissible local-field being one with at least one zero value, and, with the previously determined local-field-surveys:

determining the degree of polarization of each variable by computing, for each assignment of the variable, the probability of having zero value as given by the local-field-survey, and computing for each assignment of the variable, the maximum of this probability diminished by the sum of the probabilities for all other assignments the variable with the largest degree of polarization is assigned to its preferred state, the one with the largest probability of having zero value as given by the local-field-survey, the constraints containing this assigned variable are reduced, those which are satisfied are eliminated, in order to make a simpler new problem, (c) for iteration:

restating survey propagation steps (a) with the new problem till all variables are assigned or are unpolarized, meaning that, for all the possible assignments of the variable, the probabilities of having zero value as given by the local-field-survey (that is: for each possible assignment), diminished by the sum of the probabilities of having zero value as given by the local-field-survey for all other assignments, are equal within a predetermined resolution, for survey induced decimation steps, the preferred assignment of a variable is the one for which the probability of having zero value as given by the local-field-survey, diminished by the sum of the probabilities for all other assignments, is the largest, in case the determination of the cavity-field-surveys is not possible, none of the possible configuration of the cavity-field having a void, a penalty function is used for selecting the admissible configurations and that same penalty function is used for the determination of the local-field-surveys, the penalty function is an exponential of the type $w=\exp(-yh)$ where y is the amount of penalty and h the minimum of the values of the cavity-field for all possible states of the variable, in case the survey propagation steps updates are stopped and restarted because it is not possible to find a set of cavity-bias-surveys which does not change, the penalty amount y is reduced, the constraint and the variable to update over the graph are chosen at random, the constraint and the variable to update over the graph are chosen sequentially within a randomized list of the constraints and variables, the constraint and the variable to update over the graph are chosen by constraints, all the steps being done for all variables related to said constraint before choosing another constraint.

The invention is also about a device which has means intended for the execution of the previous method according to any one of its means or combination of its means. Notably, the invention is about a device which is a calculator. This calculator has means to resolve a constraint satisfaction problem of the physical real world, the problem being modeled with constrained discrete variables having a referenced set of possible states, said means allowing proceeding in three steps:

(a) a first one called survey propagation in which a graph of the problem and warnings are determined, a degree of polarization for a variable being computed by first establishing a list of numbers, each one giving how favorable it is to assign the variable to one state of its set of possible states, each of these numbers being computed from the probability of warnings determined in the previous messages, the list being used to compute the degree of polarization by determining to what degree the most favorable assignment in the list is better than all other possible assignments, and in that messages are exchanged within the graph in order to determine, for each constraint and each variable involved in this constraint, a message sent from the constraint to the variable containing a set of probabilities for the various patterns of warnings that the variable can receive, (b) a second one called survey induced decimation in which, using the previous messages, a degree of polarization of each variable is determined, a degree of polarization for a variable being computed by first establishing a list of numbers, each one giving how favorable it is to assign the variable to one state of its set of possible states, each of these numbers being computed from the probability of warnings determined in the previous messages, the list being used to compute the degree of polarization by determining to what degree the most favorable assignment in the list is better than all other possible assignments, and at least one variable is assigned one state of its set of possible states according to its degree of polarization as to simplify the problem, (c) finally, an iteration step for restarting survey propagation step (a) with the new simplified problem till all variables are either assigned or are unpolarized.

According to variations of the previous device, following possibilities, alone or according to any possible technical combination, are considered:

the device has means allowing to process according following steps:

(a) for Survey Propagation:

determining from the modelisation of the problem an interaction graph with edges linking nodes, the nodes being the variables, $S_1, S_2, S_3 \ldots$, and the constraints, a, b, c, d \ldots, a variable node being connected by an edge to its related constraint(s), the interaction graph being bipartite, a variable being connected only to constraints, a constraint being connected only to variables, and for each constraint which is linked to a variable, updating the graph by:

determining over the graph, first a list of elementary messages called cavity-bias sent from each constraint to its related variable, the cavity bias being a message having a number of binary items equal to the number of possible states of the variable to which it is sent, each binary item being either void or non-void, the void corresponding to an absence of constraint on the corresponding state of the variable and the non-void corresponding to the reverse, the cavity biases being initialized to random values, determining over the graph, a list of second elementary messages called cavity-fields sent from each variable to its related constraints, the cavity-field being a message having a number of integer items equal to the number of possible states of the variable which sends it, each integer item value being the number of non-void received from all cavity-biases to said variable for the referenced possible state of the said variable, determining over the graph, a list of local-fields which are sets of integer values in relation to variables, each local-field being a set having a number of integer values equal to the number of possible states of the variable and each integer value being the number of non-void received by the variable in cavity-biases for each possible state of the variable, the cavity-bias sent from a constraint a to a variable S being computed on the constraint a from the cavity-field(s) received by said constraint a from all the other variables to which said constraint a is linked, thus excluding S, and, for each of said cavity-fields, the least penalized subspace of possible states of the variable is determined as being a set of the references of possible states for which the number of non-void is minimal, then a truth table restricted to said sets for all said cavity-fields and for all the references of possible sates for the variable S is created in relation to the constrain a, from this restricted truth table a void is assigned in the cavity-bias for the referenced possible state of the variable S if the constraint is satisfied and a non-void if the constraint is not satisfied, determining over the graph, probability laws of each cavity-bias sent from a constraint a to a linked variable S with q possible states and called cavity-bias-surveys, a cavity-bias-survey being a set of $2^q$ probabilities for each possible configuration of its cavity-bias, determining over the graph, probability laws of each cavity-field sent from a variable S to a linked constraint a and called cavity-field-surveys, a cavity-field-survey being a set of probabilities for each admissible configuration of its cavity-field, an admissible configuration of cavity-field being one with at least one void, the cavity-bias-survey sent from a constraint a to a variable S being computed on the constraint a from the cavity-field-survey(s) received by said constraint a from all the other variables to which said constraint a is linked, thus excluding S, by using a look-up table characterizing constraint a, said look-up table being a list giving, for each possible assignment of all variables participating to the constraint, whether the constraint is satisfied by the assignment or not, and computing the probability that the constraint is unsatisfied, for each state of the variable, previous survey propagation steps updates being run successively on the constraints and variables along the graph, said updates being stopped after a predetermined number of updates if it is not possible to find a set of cavity-bias-surveys which does not change, when one round of updates on all constraints and on all variables participating to the constraints is performed, within a given preassigned resolution and, then, being restarted from the beginning with cavity biases initialized to new random values, (b) for Survey Induced Decimation:

determining over the graph, a local-field-survey for each variable which is a probability law of all possible local-field by computing for each variable S from all the cavity-bias-surveys received by said variable and for each possible state of said variable the joint probability of each admissible local-filed, an admissible local-field being one with at least one zero value, and, with the previously determined local-field-surveys:

determining the degree of polarization of each variable by computing, for each assignment of the variable, the probability of having zero value as given by the local-field-survey, and computing for each assignment of the variable, the maximum of this probability diminished by the sum of the probabilities for all other assignments the variable with the largest degree of polarization is assigned to its preferred state, the one with the largest probability of having zero value as given by the local-field-survey, the constraints containing this assigned variable are reduced, those which are satisfied are eliminated, in order to make a simpler new problem, (c) for iteration:

restating survey propagation steps (a) with the new problem till all variables are assigned or are unpolarized, meaning that, for all the possible assignments of the variable, the probabilities of having zero value as given by the local-field-survey, diminished by the sum of the probabilities of having zero value as given by the local-field-survey for all other assignments, are equal within a predetermined resolution, the device has means allowing that, in case the determination of the cavity-field-surveys is not possible, none of the possible configuration of the cavity-field having a void, a penalty function is used for selecting the admissible configurations and that same penalty function is used for the determination of the local-field-surveys, the penalty function is an exponential of the type $w=\exp(-yh)$ where y is the amount of penalty and h the minimum of the values of the cavity-field for all possible states of the variable, the device has means allowing that, in case the survey propagation steps updates are stopped and restarted because it is not possible to find a set of cavity-bias-surveys which does not change, the penalty amount y is reduced, the device has means to choose at random the constraint and the variable to update over the graph, the device has means to choose sequentially within a randomized list of the constraints and variables, the constraint and the variable to update over the graph, the device has means to choose by constraints the constraint and the variable to update over the graph, all the steps being done for all variables related to said constraint before choosing another constraint.

The invention is also about a manufactured article which is a calculator readable media, notably a readable disk, and which bears calculator instructions intended to operate the previous device or a calculator according to the previous process. The media is either a disk (floppy, optical, or other re-movable disk) or (a) solid state memory circuit(s) (IC card), or even a data link on which the program for the invention is physically carried into the calculator.

It has to be noted that the word calculator in the sense of the invention relates to any calculation device, either programmable such as a computer, as preferred, or wired such as a dedicated integrated circuit, which is intended to resolve a problem according to the invention and which is expressed as relations between constrained variables. As preferred device, a computer is used as it provides flexibility for the calculations and user interface, either for data entry or data output and, for example, by graphical display. Moreover it can be programmed to also provide a visual, preferably graphical, display of intermediate results over the time (iterations) for the whole problem or for some of the variables (and constraints).

The main applications of the invention are real-world problems whose can be formulated as Generic Constraint Satisfaction Problems.

Examples of such applications are graph coloring or Boolean satisfiability whereas concrete real-world problems can be found in planning tasks in robot control, factoring large integers in cryptography, formal verification of microprocessors, time tabling and scheduling (scheduling multiple variable speed machines, sports scheduling), register allocation, circuit design and testing (e.g. circuit fault analysis, constrained encoding in VLSI design, asynchronous circuit design), pattern recognition, communication and network problems (e.g. channel assignment in cellular communication networks, decoding in low density parity check codes, topological design, network decomposition, flows, reliability, blocking, and multistage switching networks . . . ), bio-informatics (e.g. gene regulatory networks analysis), inference and machine learning (artificial neural networks) . . . .

The invention will now be described in relation to the following Figures.

Figure 2:
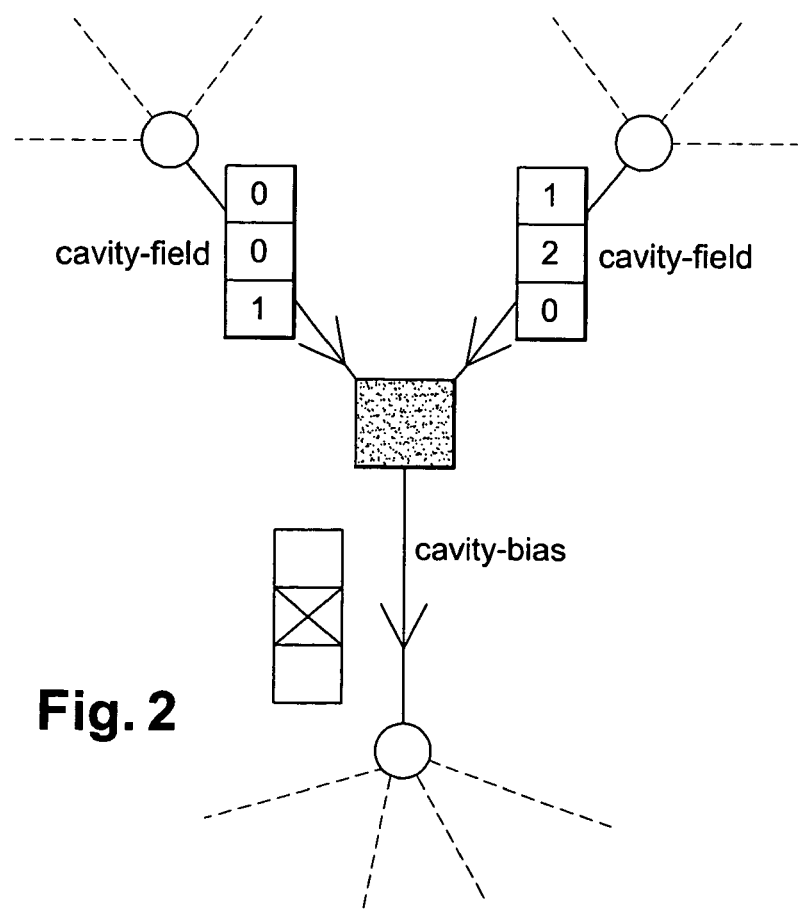
Figure 3A:
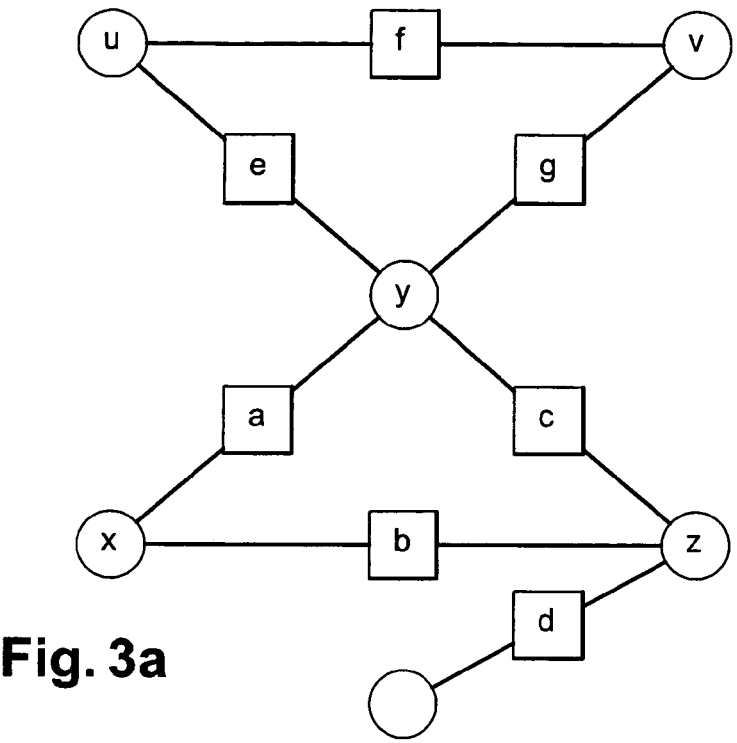
Figure 3B:
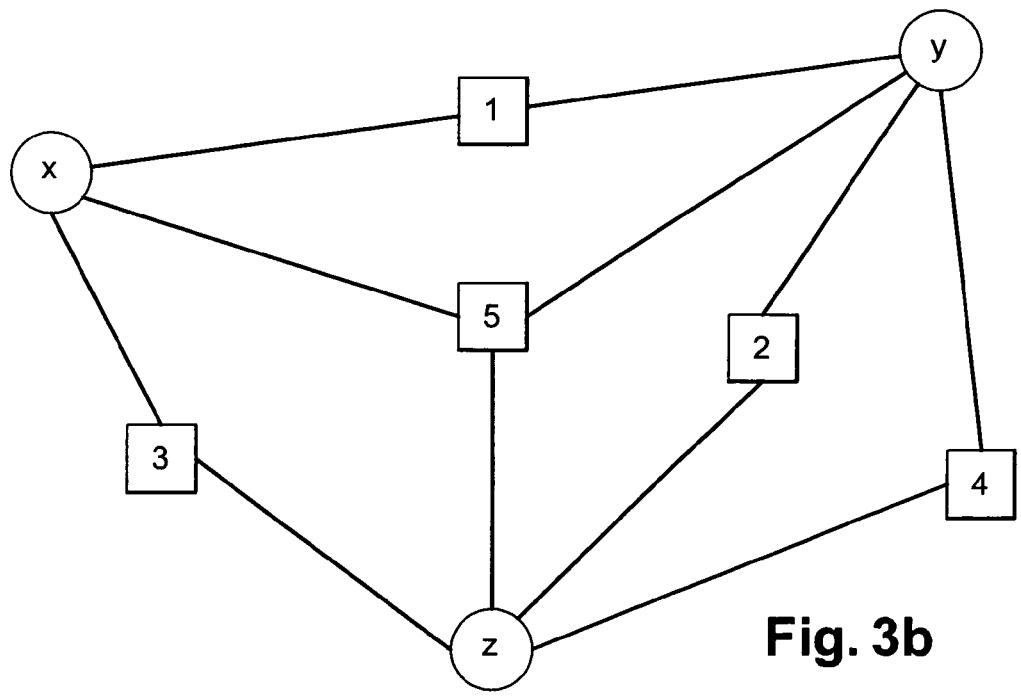
Figure 4:
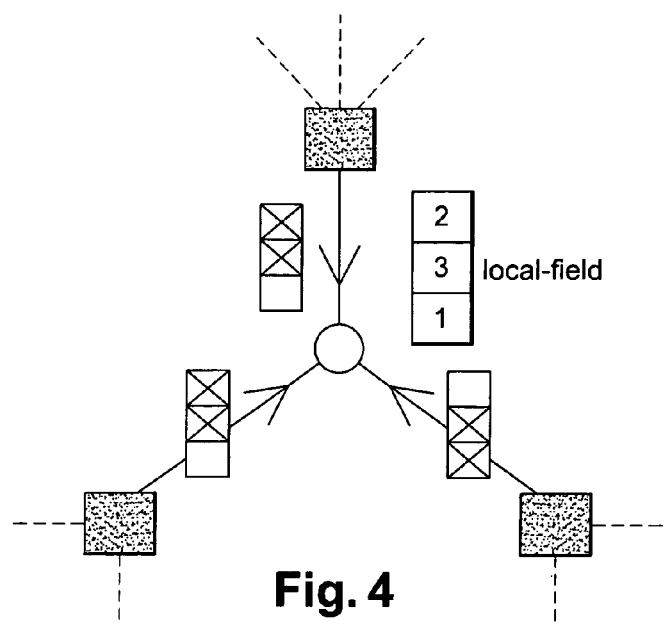
Figure 5:
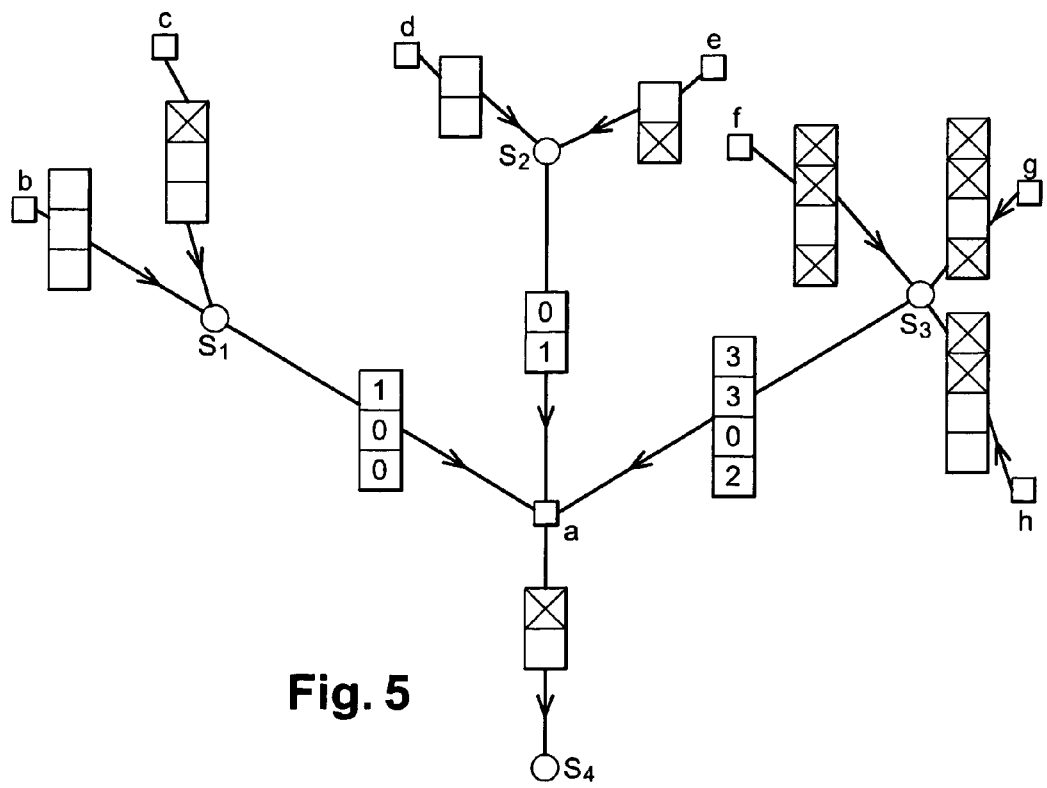
Figure 6:
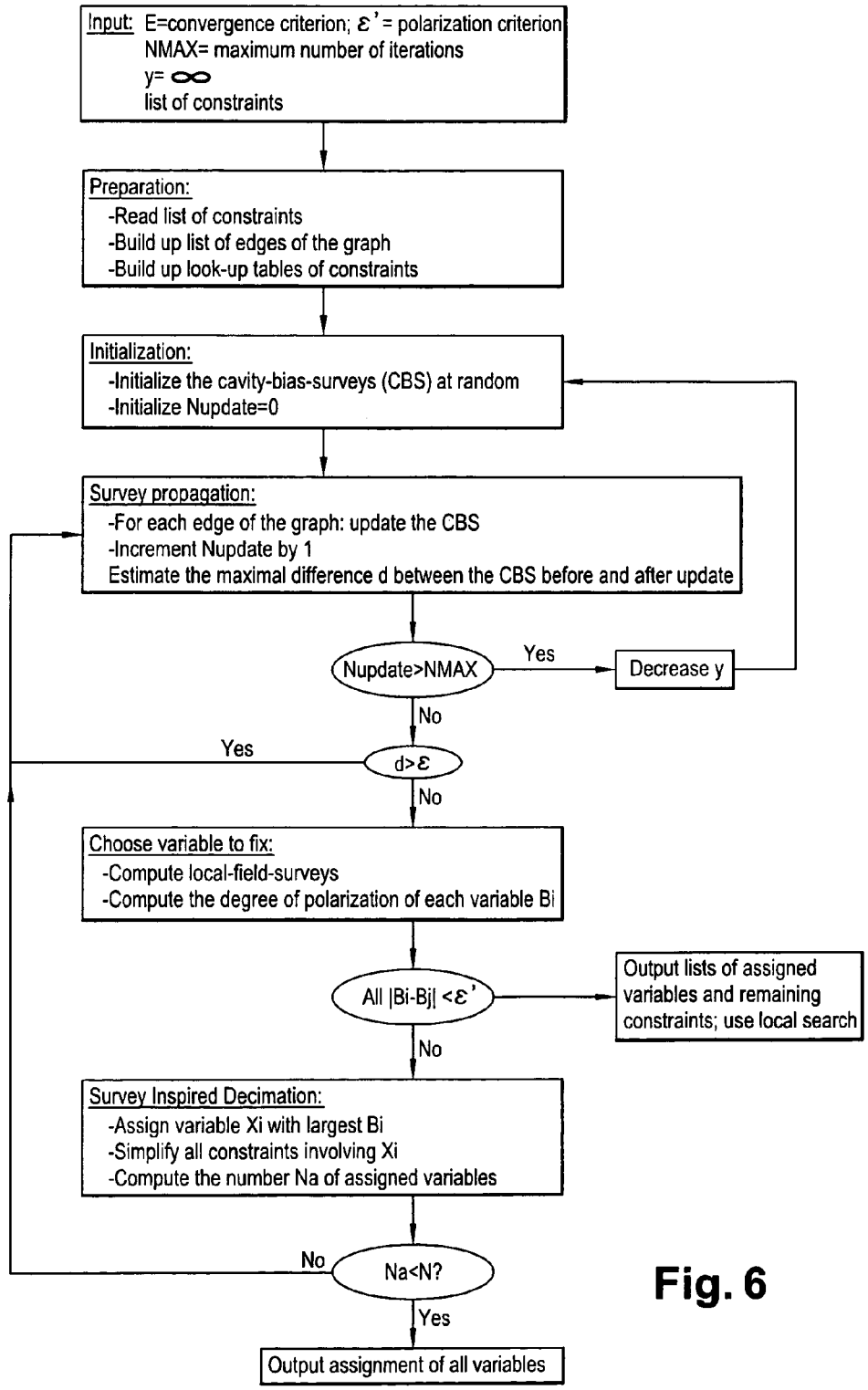
Figures 7A, 7B:
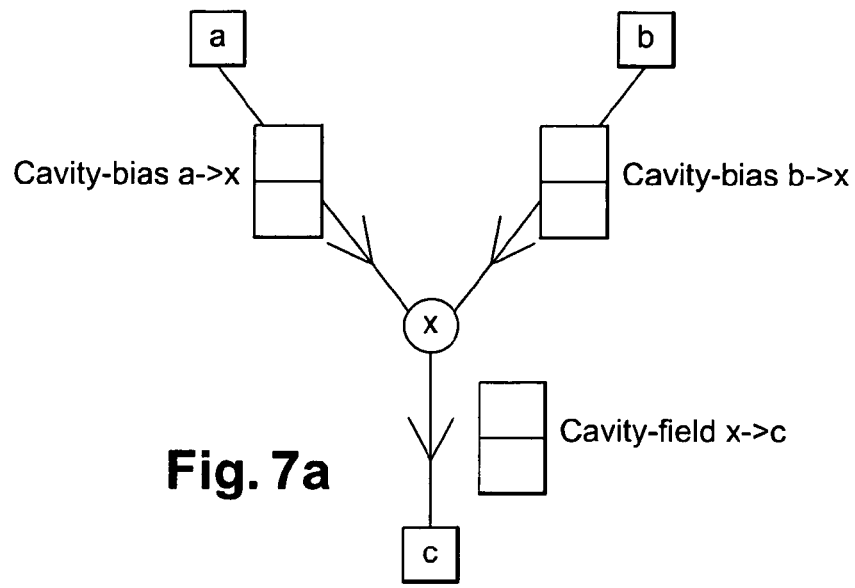
Figure 7C:
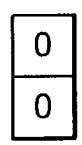
Figure 7C:
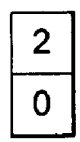
Figure 7C:
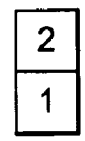
Figure 7C:
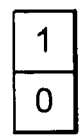
Figure 7C:
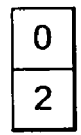
Figure 7C:
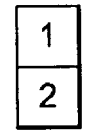
Figure 7C:
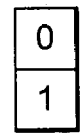
Figure 7C:
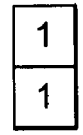
Figure 7C:
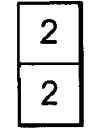

FIG. 1 is a calculator of the computer type with representation of internal problem, related graph and program, FIG. 2 is a partial graph with, at center, a function node for a constraint represented as a square linked by edges to three variable nodes for variables represented as circles, two cavity fields and a cavity bias are represented as groups of boxes, FIG. 3a is a graph representing a simple coloring constraint satisfaction problems, FIG. 3b is a graph representing a simple satisfiability problem, FIG. 4 is a partial graph with, at center, a variable node for a variable represented as a circle linked by edges to three function nodes for constraints represented as a squares, a local field and three cavity biases are represented as groups of boxes, FIG. 5 is a partial graph with four variables and eight constraints, FIG. 6 is a flowchart of the method of resolution in accordance with the present invention, FIG. 7a is a partial graph with, at center, a variable node for a variable represented as a circle linked by edges to three function nodes for constraints represented as a squares, FIG. 7b is the cavity-bias-surveys arriving onto the variable node from two of the constraints for the partial graph of FIG. 7a, FIG. 7c is the corresponding cavity-field-survey set from the variable node to the third constraint, computed with a general penalty function for the partial graph of FIG. 7a.

In addition, an Appendix is include at the end of the description with tables giving a detailed implementation of the procedure for a satisfiability problem with 20 variables and 100 constraints.

The invention is now being described in relation to a problem which is first modeled as an interaction graph between discrete variables represented as variables nodes (VN) to which constraints represented as functions nodes (FN) are linked. The discrete variables are variables that take values in a finite number of possible states. Each constraint that appears in the complete graph characterizing the given problem involves a certain number of variables. The graph can be represented as a graphical object, for example on a screen, or it can be represented as one or more structured lists of data in a computer memory and this is preferably in this last form, list(s), that the problem is modeled for the execution of the problem resolution procedure in a computer. In any case, the list(s) or the graph are two equivalent ways of modeling the problem and the list(s) is/are preferably chosen for the representation of the problem because, in a calculator such as a computer, the programs can handle more easily data objects such as structured list(s) than graphical objects. In the following description, list(s) and graph will be used equivalently but referring to graph for the explanations in relation to the Figures.

The process of the invention is intended to be executed in a calculator which is represented on FIG. 1 as a computer 4 having programmable processing means such as a microprocessor, memories for data and program, input and output channels to related devices such as a keyboard, mouse, disk storage, and a display . . . . The calculator is functioning according to a program which is stored in its memory and which has been represented as instructions in box 3 on the right of FIG. 1. This program may have been introduced in the calculator thanks to a readable media represented as a floppy disk 5 in FIG. 1. Other type of readable media may be used to carry (bear) the instructions of the program controlling the calculator. A problem has been introduced in the calculator as represented in box 1 on the right, in this example, by a map of the western part of Europe for the determination of colors to use between countries. The problem has been modeled with constrained discrete variables in the form of a graph (lists of data in the memory of the calculator) in box 2. The program being executed, results are displayed on the display output device as a list of colors to use for each country.

The procedure core of the invention is made of two steps which are iteratively repeated on the graph/list(s) which has initially been built for the modelisation of the problem. The first step, called the Survey propagation (SP), determines two sets of functions, called the cavity-bias surveys and the cavity-field surveys (collectively denominated thereafter as 'surveys'), one for each appearance of a variable in a constraint, which provide some information of probabilistic nature on the favored state of the corresponding variable. The determination of these surveys is done through a message passing procedure. Once the surveys are found, various strategies can be used to find a satisfiable configuration. The Survey propagation is then followed by a second step, called the survey induced decimation (SID), in which the surveys are used to determine which variables must be fixed, and to what values. Once these variables are fixed, one can eliminate the related constraints which are automatically satisfied and then reduce the other constraints to the subspace imposed by the fixed variables. This results in a new structured list (or graph) and the steps SP and SID are then run again on this new structured list, and this two steps process is iterated, eliminating each time a subset of the variables, until all the variables are fixed or they turn out to be under-constraint.

After some definitions, the Survey propagation (SP) procedure steps will be explained and then the survey induced decimation (SID) procedure steps. One should note that SP is the main part of the invention and that it is possible to find many alternatives ways than the one described here, of exploiting the information, practically the list, which it gives: the SID given here is just an example of exploitation of the list. As already mentioned, the Survey propagation step is a message passing process, where the various variables and constraints exchange some message along the interaction graph. The related messages, which are exchanged along the interaction graph, are called Surveys (S) and are functions, more precisely probability distributions, built from some elementary messages.

The interaction graph, then the elementary messages and local-fields, then the Surveys are now defined before the message passing procedure of the Survey propagation step. The Interaction Graph:

Each variable and each constraint is represented by a vertex on a graph. On FIG. 2, variables are represented by circles called variables nodes (vn) and constraints by squares called function nodes (fn). A variable and its related constraint are connected by an edge whenever the variable is involved in that constraint. This is a bipartite graph: a variable is connected only to constraints, a constraint is connected only to variables. A constraint has the structure of a truth table giving all the assignments of the variables which satisfy the constraints.

FIG. 2a gives the interaction graph for a simple problem of graph coloring with four nodes. Each constraint connects exactly two variables. If the variables can take three colors, blue red and green, the truth table is the same for each constraint. For a constraint connecting variables x and y, the truth table is (Yes means that the constraint is satisfied):

| Variable x | Variable y | Constraint |
|---|---|---|
| Blue | blue | No |
| Blue | Red | Yes |
| Blue | Green | Yes |
| Red | Blue | Yes |
| Red | Red | No |
| Red | Green | Yes |
| Green | Blue | Yes |
| Green | Red | Yes |
| Green | Green | No |

FIG. 3b gives the interaction graph for the problem of satisfiability with three variables x,y,z and five constraints mentioned before (The constraints are: 1) x.or.(not y); 2) (not x).or.z; 3) (not y).or.(not z); 4) y.or.(not z); 5) x.or.y.or.(not z).).

The truth table for constraint 1) is:

| Variable x | Variable y | Constraint |
|---|---|---|
| True | True | Yes |
| True | False | Yes |
| False | True | No |
| False | False | Yes |

The Elementary Messages Sent Along the Edges of the Graph:

Firstly, a cavity-bias (cb) is an elementary message which a given variable receives from one of the constraints to which it is connected. For a variable which can be in q possible states, this message is made of q binary sub-messages represented on FIG. 2 as q boxes, each of which can be either 'void' or 'warning'. For a box related to a possible value of the variable, void is an empty sub-message, represented on FIG. 2 as an empty box. The warning sub-message related to a possible value s of the variable in a cavity-bias is represented on FIG. 2 as a cross and it means that, according to the constraint sending the message, "it is dangerous for the variable to be in the state s". As a consequence, the meaning of a completely void message, in other words with all sub-messages voids, is that the constraint is posing no warning on the variable. A warning is thus carrying negative information in that the variable is better not in the related state. In fact, if a constraint was for a variable to be in a specific state, it would be converted to a warning for all the other possible states of the variable and a void for that specific state. This also means that the problem can be treated in reverse. The computation of cavity-bias will be dealt with at the end of the local-field definition part.

Secondly, a cavity-field (cf) is an elementary message that a given variable sends to one of the constraints to which it is connected. For a variable which can be in q possible states, this message has q sub-messages represented on FIG. 2 as q boxes, each of which being an integer giving the number of warnings received in the corresponding box of the cavity-biases coming to the variable from all the other constraints to which it is connected. As a consequence, the meaning of a completely null message, in other words with all sub-messages nulls, is that the variable does not receive any warning.

The cavity-bias computation is now dealt with. In order to determine the presence of a warning or not in the cavity-bias sent from one constraint (called a) to one variable (called S) to which it is connected, the constraint considers all the cavity-fields which it receives from all the other variables to which it is connected. In each such cavity-field, it determines the "least-penalized subspace" which is the set of boxes where the number of warnings (or more generally non void) is minimum. The truth table of the constraint a, which is built, is restricted to the values of variables belonging respectively to their least-penalized subspace. For a given value of S, if there is at least one entry of this restricted truth table where the constraint is satisfied, the corresponding box of the cavity-bias a→S is void. Otherwise, the corresponding box has a warning.

The Surveys:

Firstly, a cavity-bias-survey is considered. The cavity-bias sent from one constraint to one of the variables connected to it has q boxes (considering a variable which can be in q states), each of them can be in two states, either void or warning. Therefore the cavity-bias has $2^q$ possible states. The corresponding cavity-bias-survey is a probability law on this space, giving the probability of each possible configuration of the warnings. Practically, it is given by $2^q$ positive real numbers, the sum of which is equal to 1. The computation of cavity-bias-survey will be dealt with at the end of this Surveys definition part.

Secondly, a cavity-field-survey is considered. The cavity-field sent from one variable to one of the constraints to which it is connected has q boxes (considering a variable which can be in q states), each of them is an integer. The cavity-field-survey is a probability law on this space of possible elementary messages.

For instance, considering the coloring problem of FIG. 3a with three colors, blue, red and green. A cavity-field sent from the variable z to the constraint b consists of three boxes (one for each color). In each such box, it contains the number of warnings which are received by variable z from the constraints c and d. This number can be either 0, 1 or 2 (For instance if the cavity bias sent from c to z is a warning not to be green, and the warning sent from d to z is a warning not to be blue, the cavity-field sent from z to b contains a one in the blue box, a zero in the red box, and a one in the green box). The cavity-field from z to b is determined from two cavity-biases (c to z and d to z); each cavity-bias contains at most one warning (because of the nature of the coloring problem; therefore the sum of the integers in each of the three boxes of the cavity-field sent from z to is less or equal to 2: the possible cavity-fields from z to b are (0,0,0), (1,0,0), (0,1,0), (0,0,1), (2,0,0), (0,2,0), (0,0,2), (1,1,0), (1,0,1), (0,1,1), where the first number is the number of warnings in the blue box, the second is the number of warnings in the red box, and the third number is the number of warnings in the green box. The cavity-field survey sent from z to b is the probability of each one of these ten cavity-fields: it is given by ten real numbers in [0,1], the sum of which is equal to one.

The Survey Propagation:

The computation of cavity-field-surveys is now dealt with. The cavity-field-survey sent from one variable to one of the constraints to which it is connected is computed as follows: the variable considers all the cavity-bias-surveys it receives from all the other constraints to which it is connected. It deduces the joint probability of the total number of warnings received from these constraints in each box (that is for each possible value of the variable). This probability is then projected onto the subspace of admissible cavity-fields where at least one of the boxes has zero warnings. For instance consider again the coloring problem of FIG. 3a: let us compute the cavity-field-survey sent from variable y to constraint c. Variable y considers the three inputs which are the cavity-bias-surveys from constraints a, e and g to y. Each of these cavity-bias-surveys is a probability law on the set of four possible cavity biases: void (V), a warning in the blue box (B), a warning in the red box (R), a warning in the green box (G). For instance the cavity-bias-survey from a to y is given by the four positive numbers (a_V, a_B, a_R, a_G), where a_V is the probability of the void message, a_B is the probability of the warning in the blue box, etc . . . , and a_V+a_B+a_R+a_G=1. Similarly, denote by (g_V, g_B, g_R, g_G) the cavity-bias-survey from g to y, and by (e_V, e_B, e_R, e_G) the cavity-bias-survey from e to y. Possible cavity-fields from y to c consist of messages of the type (n_1,n_2,n_3), where n_1 is the number of warnings received by y (from constraints a,e,g) in the blue box, n_2 is the number of warnings received by y (from constraints a,e,g) in the red box, n_3 is the number of warnings received by y (from constraints a,e,g) in the green box, and the sum n_1+n_2+n_3 is smaller or equal to three. If we would accept all messages, the probability of the cavity-field (1,1,0) would be equal to (a_B*g_R+a_B*e_R+g_B*e_R+g_B*a_R+e_B*g_R+e_B*a_R) and the probability of the cavity-field (1,1,1) would be equal to P_111=(a_B*g_R*e_G+a_B*e_R*g_G+g_B*a_R*e_G+g_B*e_R*a_G+e_B*a_R*g_G+e_B*g_R*a_G). However, as we seek a satisfiable assignment of variables, the cavity-field (1,1,1) is forbidden. In this simple case, this is the only forbidden cavity-field. The cavity-field-survey gives the relative probability of each allowed cavity-field. For instance the probability of the cavity-field (1,1,0) is (a_B*g_R+a_B*e_R+g B*e_R+g B*a_R+e_B*g_R+e_B*a_R)/(1−p_111).

The computation of cavity-bias-surveys is now dealt with. The cavity-bias-survey sent from one constraint to one of the variables connected to it is computed as follows: the constraint considers all the cavity-field-surveys it receives from all the other variables connected to it. It deduces the total joint probability for the outgoing cavity-bias as follows: for a given assignment of the variable, the constraint computes, using the incoming cavity-field-surveys and the truth table, the probability that the constraint is unsatisfied. This gives the value of the cavity-bias-survey in the box corresponding to this assignment.

The message passing procedure.

The procedure follows the cavity-bias-surveys going from each of the constraints to each of the variables connected to it. It initializes the cavity-biases to random values. The updating scheme along the graph for the survey propagation, can take several forms of updates. A simple one is to choose at random a constraint, say constraint c, choose at random a variable which is connected to it, say variable v, and update the cavity-bias-survey going from the constraint c to the variable v. This update uses the previous rules of computation as follows: one first computes all the cavity-field-biases sent to c from variables which are connected to c but distinct from v (these can be computed from the knowledge of all cavity-bias-surveys using the above rules for computing cavity-field-surveys); one then computes the cavity-bias-survey from c to v using these cavity-field-surveys and the truth table for c. Other possible updating schemes involve in particular the sequential updating of all the cavity-bias-surveys corresponding to one given constraint and they can turn out to be more efficient in practice.

In other words, the constraints and the variables may be chosen at random per se, that is a same constrain and/or variable may be chosen more than once by the randomized selection, or they may be chosen at random within a list, that is, for example, sequentially within a randomized list.

The procedure usually converges when there exits an assignment of the variables satisfying all the constraints. During this message passing procedure, the cavity-bias-survey from one constraint to one variable will change many times. Convergence is obtained when the cavity-bias-surveys no longer change. A convergence criterion can be fixed by choosing a small number epsilon, and deciding that the message passing procedure has converged when all the probabilities appearing in all cavity-bias-surveys change by less than epsilon when one performs N cavity-bias-surveys (N is the number of variables). In practice a value of epsilon about one percent is enough, one can use larger values when the problems are not too difficult to solve for a faster convergence.

In the case in which the convergence is not reached after a certain number of updates, it can be restarted from another initial condition, or it can be restarted using a penalty function which will be described below.

The previous computations are done on the graph in order to determine all the cavity-bias-surveys (from which one easily gets all the cavity-field-surveys) and this corresponds to the Survey propagation procedure steps. When these are known it is possible to execute the survey induced decimation procedure steps which selects, for a well chosen variable x, a specific assignment. Once this assignment has been done, the corresponding variable is eliminated, the constraints which contained this variable are reduced (their truth table are reevaluated, depending only on the assignments of the other variables, when x has been assigned). Some constraints may be automatically satisfied. This gives a simplified problem and a new simplified graph. It is then possible to use this new simplified graph to start again the whole process (the survey propagation procedure and the n the survey induced decimation procedure) which can be repeated iteratively.

We now explain in more details the survey decimation procedure. We first define local-field and local-field-surveys, and then explain how to use them in order to choose a variable and the value to which it must be assigned.

The definition and computation of local-field-survey are now dealt with.

When the survey propagation procedure has converged, one obtains a set of cavity-bias-surveys (one for every edge connecting a constraint to a variable). These are used to compute local-field-surveys. A local-field (lf) on one of the variables, which can be in q possible states, has q boxes. Each box of the local-field holds an integer giving the number of warnings received in the corresponding boxes in the cavity-biases coming to the variable from all the constraints to which it is connected as represented on FIG. 4. The local-field-survey is a probability law on this space of possible local-fields. The variable considers all the cavity-bias-surveys it receives from all the constraints to which it is connected. It deduces the joint probability of the total number of warnings received from these constraints in each box (that is for each possible assignment of the variable). This probability is then projected onto the space of admissible fields, where at least one of the boxes has zero warnings.

We are now explaining this part of the process with an example for the simple satisfiability problem of FIG. 3b. We have three variables, x, y, z, and five constraints: 1) x.or.(not y); 2) (not x).or.z; 3) (not y).or.(not z); 4) y.or.(not z); 5) x.or.y.or.(not z). The cavity-bias-surveys obtained for this problem are:

From constraint 1 to variable x: probability is one of no warning.

From constraint 1 to variable y: probability is one of warning: "y should not be assigned to true"

From constraint 2 to variable y: probability is one of no warning.

From constraint 2 to variable z: probability is one of no warning.

From constraint 3 to variable x: probability is one of warning: "x should not be assigned to true".

From constraint 3 to variable z: probability is one of no warning.

From constraint 4 to variable y: probability is one of no warning.

From constraint 4 to variable z: probability is one of warning: "z should not be assigned to true".

From constraint 5 to variable x: probability is one of no warning.

From constraint 5 to variable y: probability is one of no warning.

From constraint 5 to variable z: probability is one of warning: "z should not be assigned to true".

(Because this is a very simple problem, all probabilities turn out to be zero or one). Let us deduce the cavity-field-surveys. On variable x, the cavity cavity-field-survey is: "probability one for a local-field (1,0) (where (n_1,n_2) means n_1 warnings for x being assigned as TRUE, n_2 warnings for x being assigned as FALSE), probability zero for all other local-fields". On variable y, the cavity cavity-field-survey is: "probability one for a local-field (1,0), probability zero for all other local-fields". On variable z, the cavity cavity-field-survey is: "probability one for a local-field (2,0), probability zero for all other local-fields".

The choice of the variable and of the value to which it is assigned is now dealt with.

The local-field-survey gives a probability law for the warnings encountered by this variable when it is assigned a given value. A variable is said to be polarized if it has a larger probability of having zero warnings when it is in one given state than when it is in all the other states. It is possible to use several criteria to define a degree of polarization quantitatively. One of them is the following: for a variable which can be assigned q possible values, the total probabilities found in the local-field-survey for having zero warning when the variable is assigned each of its possible values is calculated. For an assignment X_i=x, this probability is denoted by p_x. It is then possible to define the degree of polarization of the variable as the maximum over x of the numbers (p_x-(sum over all assignments y different from x of p_y)). The variable is said to be unpolarized if all these numbers (for all possible assignments x) are equal (within a given resolution). Other variants are possible.

This degree of polarization, known for every variable, can be used to identify some favorable variables for operating the survey induced decimation (SID) procedure part of the invention.

It is possible to pick up the variable with the largest degree of polarization (or one of them randomly if several of them have the same largest degree), or to pick up at random one of the variables in the best n percent of variables, as measured from the degree of polarization. It is also possible to fix simultaneously several variables. These variants of the procedure depend on ho difficult the problem is: in relatively easy problems, it is faster to fix a certain fraction of the variables at each iteration of the survey inspired decimation, while in more difficult problems one should fix one variable at a time. The variables are assigned to their preferred value (the one giving the largest probability of having zero warning). Once the strongly polarized variables have been assigned a value, the truth tables of all the constraints to which they are connected are restricted. Some of the constraints may disappear in this process. This way, a new problem with fewer variables, on which the Survey Propagation procedure can be started again, is obtained.

This procedure is now explained in the case of the satisfiability problem of FIG. 3$b$. The cavity-field-surveys show that the degree of polarization of all the three variables are equal. For instance variable z is fixed to FALSE. Then the constraints 3, 4, 5 are automatically satisfied (for instance constraint 3: "(not y).or.(not z)" holds if z is FALSE whatever is the value of y), and they disappear. Constraint 1 is unchanged, constraint 2 becomes "(not x)" and imposes to assign it to FALSE. Then constraint 1 imposes to assign y to FALSE: the assignment is x=FALSE, y=FALSE, z=FALSE.

The procedure of reducing the truth table must be performed iteratively until there is no constraint allowing to assign one variable for sure. In the previous example, the assignment is immediately obtained.

The whole process (survey propagation+fixing most polarized variables) is then iterated. It ends when, either all variables have been fixed, or all variables are unpolarized. In this last case the problem is almost always easily solved by simple local search procedures.

With FIG. 5, a concrete application of the update of cavity-bias-survey procedure part of the invention is detailed. The problem has been modelised as a graph and we are now considering a part of this graph with FIG. 5 on which the sub-graph involving the constraints a, b, c, d, e, f, g, h, represented as squares, and the variables $S_1$, $S_2$, $S_3$, $S_4$, represented as circles, and the elementary messages which are passed along it represented as set of boxes. Notice that, on each edge connecting a variable node and a function node, the number of boxes, which the elementary message contains, is equal to the number of possible states of the variable. Here, the variables $S_1$, $S_2$, $S_3$, $S_4$ can be respectively in 3, 2, 4, 2 states.

As concerns the elementary messages, the cavity-bias sent from constraint a to variable $S_4$ is computed. The constraint a looks at all the neighboring variables different from $S_4$, which are $S_1$, $S_2$, $S_3$. For each of them it must determine the cavity-field.

For the cavity-field sent from $S_1$ to a, the variable $S_1$ has three possible states. The variable $S_1$ looks at the other constraints to which it is connected (b and c) and it sums all the cavity-biases received from those. In its first state (possible value), it receives a warning (more generally a non void) from c (first box with a cross). The cavity-field $S_1 \rightarrow a$ in the first box is thus equal to 1 and in the second box it equals 0 and in the third box it equals 0. The least penalized subspace for the cavity-field $S_1 \rightarrow a$ is the subspace $S_1 \in \{2,3\}$.

It is proceeded similarly with the cavity-field sent from $S_2$ to a. For the cavity-field sent from $S_2$ to a, the variable $S_2$ has two possible states. The variable $S_2$ looks at the other constraints to which it is connected (d and e) and it sums all the cavity-biases received from those. In its second state (possible value), it receives a warning (more generally a non void) from e (second box with a cross). The cavity-field $S_2 \rightarrow a$ in the second box is thus equal to 1 and in the first box it equals 0. Here, $S_2$ has two possible values and its least penalized subspace is $S_2 \in \{1\}$.

It is proceeded similarly with the cavity-field sent from $S_3$ to a. For the cavity-field sent from $S_3$ to a, the variable $S_3$ has four possible states. The variable $S_3$ looks at the other constraints to which it is connected (f, g and h) and it sums all the cavity-biases received from those. In its first state (possible value), it receives three warning (more generally non voids) from f, g and h (first boxes with crosses). The cavity-field $S_3 \to a$ in the first box is thus equal to 3 and, similarly, in the second box it equals 3, in the third box it equals 0 as all constraints are voids for the related possible value of this variable, and lastly, the fourth box equal 2 from the two warnings (more generally non voids) received from f and g. Here, $S_3$ has four possible values and its least penalized subspace is $S_3 \epsilon \{3\}$.

The truth table of the constraint a constrained to values $S_1 \epsilon \{2,3\}$, $S_2 \epsilon \{1\}$, $S_3 \epsilon \{3\}$ is now considered. If we suppose that it takes the following form (a value N means that the constraint a is not satisfied, a value Y means that it is satisfied):

| $S_1$ | 2 | 3 | 2 | 3 |
|---|---|---|---|---|
| $S_2$ | 1 | 1 | 1 | 1 |
| $S_3$ | 3 | 3 | 3 | 3 |
| $S_4$ | 1 | 1 | 2 | 2 |
| Constraint | N | N | Y | N |

If the variable $S_4$ takes value 1, there is no choice of $S_1 \epsilon \{2,3\}$, $S_2 \epsilon \{1\}$, $S_3 \epsilon \{3\}$ able to satisfy the constraint. Therefore the cavity-bias sent from a to $S_4$ has a cross, meaning a warning (non void), in its first box. If variable $S_4$ takes value 2, the choice $S_1 \epsilon \{2\}$, $S_2 \epsilon \{1\}$, $S_3 \epsilon \{3\}$ does satisfy the constraint. Therefore the second box of the cavity-bias sent from a to $S_4$ is void.

As concerns the surveys, the cavity-bias-survey sent from constraint a to variable $S_4$ and also the cavity-field-surveys are computed. The constraint a looks at all the neighboring variables different from $S_4$, and which are $S_1$, $S_2$, $S_3$. For each of those variables it must determine the related cavity-field-survey.

For instance, considering the case of the cavity-field-survey sent from $S_2$ to a, it can be computed from the cavity-bias-surveys sent from d and e to $S_2$. Because $S_2$ can be in two states, the cavity-bias $d \to S_2$ can take the four possible forms: (void in box 1, void in box 2), (warning in box 1, void in box 2), (void in box 1, warning in box 2), (warning in box 1, warning in box 2), which writes as (0,0), (1,0), (0,1), (1,1). The cavity-bias-survey $d \to S_2$ is a collection of four positive numbers $p_{(0,0)}$, $p_{(1,0)}$, $p_{(0,1)}$ and $p_{(1,1)}$ whose sum is equal to one and which are the probabilities of each of the possible cavity-bias.

Similarly, the cavity-bias-survey $e \to S_2$ is a collection of four positive numbers $q_{(0,0)}$, $q_{(1,0)}$, $q_{(0,1)}$ et $q_{(1,1)}$ whose sum is equal to one.

The cavity-field sent from $S_2$ to a is computed as the sum of warnings sent from d and e to $S_2$ in each box and as such it can take nine possible forms which writes as (0,0), (1,0), (0,1), (1,1), (0,2), (2,0), (2,1), (1,2) and (2,2). Among these possible forms, the subset of admissible cavity-fields is the subset where there is at least one box with zero warning and this subset is thus: (0,0), (1,0), (0,1), (0,2), (2,0). As a consequence, the Cavity-field-survey Sent from $S_2$ to a is given by five positive numbers:

$$r_{(1,0)}^{(2)} r_{(1,0)}^{(2)} r_{(0,1)}^{(2)} r_{(0,2)}^{(2)} r_{(2,0)}^{(2)}$$

whose sum is equal to one.

The cavity-field (0,0) is obtained in the case where both cavity biases from d and e to $S_2$ are (0,0). Its probability is thus the joint probability for each related form: $p_{(0,0)} q_{(0,0)}$, that is the product of $p_{(0,0)}$ and $q_{(0,0)}$. This leads to $r_{(0,0)}^{(2)} = C p_{(0,0)} q_{(0,0)}$, that is the product of C, $p_{(0,0)}$ and $q_{(0,0)}$ where C is a normalization constant which determination will be explained below.

The cavity-field (0,1) is obtained in two cases: the first where the cavity-bias from d to $S_2$ is (0,0) and the cavity bias from e to $S_2$ is (0,1); the second where cavity-bias from d to $S_2$ is (0,1) and the cavity bias from e to $S_2$ is (0,0). Therefore $r_{(0,1)}^{(2)} = C(p_{(0,0)} q_{(0,1)} + p_{(0,1)} q_{(0,0)})$ that is the sum of each joint probability.

The cavity-field (1,0) is obtained in two cases: the first where the cavity-bias from d to $S_2$ is (0,0) and the cavity bias from e to $S_2$ is (1,0); the second where cavity-bias from d to $S_2$ is (1,0) and the cavity bias from e to $S_2$ is (0,0). Therefore $r_{(1,0)}^{(2)} = C(p_{(0,0)} q_{(1,0)} + p_{(1,0)} q_{(0,0)})$ that is the sum of each joint probability.

The cavity-field (0,2) is obtained in the case where the cavity-bias from d to $S_2$ is (0,1) and the cavity bias from e to $S_2$ is (0,1). Its probability is thus the joint probability for each related form: $p_{(0,1)} q_{(0,1)}$, that is the product of $p_{(0,1)}$ and $q_{(0,1)}$. This leads to $r_{(0,2)}^{(2)} = C p_{(0,1)} q_{(0,1)}$, that is the product of C, $p_{(0,1)}$ and $q_{(0,1)}$.

The cavity-field (2,0) is obtained in the case where the cavity-bias from d to $S_2$ is (1,0) and the cavity bias from e to $S_2$ is (1,0). Its probability is thus the joint probability for each related form: $p_{(1,0)} q_{(1,0)}$, that is the product of $p_{(1,0)}$ and $q_{(1,0)}$. This leads to $r_{(2,0)}^{(2)} = C p_{(1,0)} q_{(1,0)}$, that is the product of C, $p_{(1,0)}$ and $q_{(1,0)}$.

Then, we have the full cavity field in its admissible subset:

$$r_{(0,0)}^{(2)} = C p_{(0,0)} q_{(0,0)}$$

$$r_{(0,1)}^{(2)} = C(p_{(0,0)} q_{(0,1)} + p_{(1,0)} q_{(0,0)})$$

$$r_{(1,0)}^{(2)} = C(p_{(0,0)} q_{(1,0)} + p_{(1,0)} q_{(0,0)})$$

$$r_{(0,2)}^{(2)} = C p_{(0,1)} q_{(0,1)}$$

$$r_{(2,0)}^{(2)} = C p_{(1,0)} q_{(1,0)}$$

where C is computed such that $r_{0,0)}^{(2)} + r_{(1,0)}^{(2)} + r_{(0,1)}^{(2)} + r_{(0,2)}^{(2)} + r_{(2,0)}^{(2)} = 1$.

The cavity-field-survey send from $S_1$ to a can be computed in a similar way as $S_2$ to a, but this time we have more possible forms because $S_1$ can be in three states. These possible forms are referred for the following explanation as $(m_1, m_2, m_3)$ where $m_1, m_2, m_3 \epsilon \{0,1,2\}$. Among these possible forms, the subset of admissible cavity-fields is the subset where there is at least one box with zero warning and this subset is thus defined as having forms where $m_1 m_2 m_3 = 0$, that is the product is zero. The full cavity field in its admissible subset, which is not detailed in full here but is obtained in a similar way as above, is defined as a set of numbers $r_{(m1,m2,m3)}^{(1)}$ where $m_1, m_2, m_3 \epsilon \{0, 1, 2\}$ and $m_1 m_2 m_3 = 0$.

The cavity-field-survey send from $S_3$ to a can be computed in a similar way as $S_2$ to a, but this time we have more possible forms because $S_3$ can be in four states. These possible forms are referred for the following explanation as $(m_1, m_2, m_3, m_4)$ where $m_1, m_2, m_3, m_4 \epsilon \{0,1,2,3\}$. Among these possible forms, the subset of admissible cavity-fields is the subset where there is at least one box with zero warning and this subset is thus defined as having forms where $m_1 \ m_2 \ m_3 \ m_4 = 0$, that is the product is zero. The full cavity field in its admissible subset, which is not detailed in full here but is obtained in a similar way as above, is defined as a set of numbers $r_{(m1,m2,m3,m4)}^{(3)}$ where $m_1, m_2, m_3, m_4 \epsilon \{0, 1,2,3\}$ and $m_1 m_2 m_3 m_4 = 0$.

From all the three cavity-field-surveys, the cavity-bias-survey from a to $S_4$ is computed as follows. Each configuration of the incoming cavity-fields is characterized by the values $(m_1,m_2,m_3)$ for the cavity-field $S_1 \to a$, $(m_1',m_2')$ for the cavity-field $S_2 \to a$, $(m_1'',m_2'',m_3'',m_4'')$ for the cavity-field $S_3 \to a$. For each possible value of $(m_1,m_2,m_3)$, $(m_1',m_2')$, $(m_1'',m_2'',m_3'',m_4'')$ and given $S_4=t$, one of its possible values, the elementary cavity-bias $S_1 \to a$ is computed as described in the section on elementary messages (one first finds the least penalized subspace of each incoming cavity-field, and then finds out from the truth table of constraint a whether there exist an allowed configuration in the least penalized subspace). The answer is either a void or a in the box related to t of the cavity-bias. So given $(m_1,m_2,m_3)$, $(m_1',m_2')$, $(m_1'',m_2'',m_3'',m_4'')$, the elementary cavity-bias $S_1 \to a$ can be computed. The probability for this cavity-bias gets a contribution $r_{(m1,m2,m3)}^{(1)}$ $r_{(m1',m2')}^{(2)}$ $r_{(m1'',m2'',m3'',m4'')}^{(3)}$. By summing over all configurations of $(m_1,m_2,m_3)$, $(m_1',m_2')$, $(m_1'',m_2'',m_3'',m_4'')$ the cavity-bias-survey is computed.

In the annex to the description, a detailed example of application of survey propagation and survey-inspired decimation for solving a concrete satisfiability problem with 20 variables and 100 constraints is given with explanations and numerical results of computation. The flow chart of the corresponding procedure is given in FIG. 6.

The program which has been used allows selection of functioning parameters such as the way updates along the graph are done, either by lazy convergence or sequentially, or such as the maximum number of iterations until convergence. The main steps of this program are summarized in FIG. 6 flow chard in which a penalty function can be used. As input (input box at the top), the convergence criterion ($\epsilon$) and polarization criterion ($\epsilon'$) are inputted with the maximum number of iterations cycles (NMAX) and the list of constraints in relation to the variables. During this input step, the penalty amount y for a penalty function is initialized to an infinite value. A next step, second box from the top, is for the preparation of the data which will be processed. During this preparation step, the list of constraints in relation to the variable is read as to built-up a list of edges of the graph and look-up tables of constraints. The next step is for initialization, third box from the top, in which the cavity-bias-surveys are initialized at random and a computation variable for the number of updates cycles, Nupdate, initialized to zero. Then, the survey propagation is processed, survey propagation box, with, for each edge of the graph, updates of the cavity-bias-surveys, increment of Nupdate and the estimation of the maximal difference d between cavity-bias-surveys before and after the current update cycle. After this last step of survey propagation, a first test is done on the number of updates cycles, Nupdate: if Nupdate is greater than NMAX, the maximum number of iteration cycles then y (penalty) is decreased and the program goes back to the initialization step. If this is not the case, a second test is done on the maximal difference d, if the maximal difference is greater than the convergence criterion, the program goes back to the survey propagation step again. If this is not the case, the next step after those two (negative) tests are for choosing a variable to fix in which local-fields-surveys are computed and the degree of polarization $B_i$ of each variable Bi computed. Then a test is done on the degree of polarization: if all the absolute values of differences are lower the polarization criterion, a local search procedure is initiated after output of lists of assigned variables and remaining constraints. If not, the survey inspired decimation step is started, before last box, in which the variable $X_i$ with the largest degree of polarization $B_i$ is assigned, the constraints involving $X_i$ simplified and the number $N_a$ of assigned variables computed. A last test is then done in which if all the variables are not assigned, that is Na<N, with N the total number of variables, the program goes back to the survey propagation step. If this is not the case, that is all variables assigned, the results of the assignments of all the variables are outputted.

The procedure has been tested on the case of satisfiability of random formulas built from random 3-clauses (the so called random 3-SAT problem), which is a standard benchmark in the field: in each constraint three variables are chosen randomly, for each of them one chooses the literal which is either the variable or its negation, with probability ½, and the constraint is defined as the "or" of the three literals.

The difficult region is when there are around 4.2 constraints per variables: in this case, a generic instance of the problem has a solution, but it is very difficult to find it. Problems with up to 10000000 variables can be solved with the invention (survey propagation procedure+survey induced decimation procedure) on a PC (personal computer), while the best traditional method is limited to around 50000 variables. Similar test have been performed on generic hard random K-SAT problems (e.g. K>3, balanced formulas, etc.) and on q-coloring problems. The performance has shown that the invention (SP+SID) outperforms the current state of the art algorithm by several orders of magnitude.

The current invention can be implemented in any programmatic language such as, for example C, C++, COBOL, BASIC, or other. Due to the use of messages and lists, the preferred programmatic languages are the ones using objects such as C++.

It has to be understood that even if the invention has been described with a problem represented as a graph (list) of variables and constraints, those variables (and thus the related constraints) may be either simple or complex (functions or grouping of simple variables) and a switch from simple to complex (or the reverse) can even been made during the resolution process of the problem. For instance, the procedure which has been described can also be adapted by grouping together some variables into one or more larger effective variables. This is particularly useful in practice if some variables are coupled through many constraints.

Even if the invention has been described in order to compute local-field-survey as a probability law of having a penalty for each state of a variable, it is understood that the invention can also be worked in reverse, that is, a local-field-survey as a probability law of having no penalty for each state. Other variations are also possible as now described.

The procedure (survey propagation+survey inspired decimation) described so far deals with finding an assignment of the variables which satisfies all constraints. In the case in which there is no such assignment, or in the case in which the procedure does not find it, it is possible to modify and generalize the survey propagation algorithm in such a way as to try to find an assignment of the variables which violates the smallest number of constraints. This generalization is called survey propagation with penalties. It is particularly useful when the update rule of the cavity-bias-surveys in the standard survey propagation cannot be performed. This happens whenever, in the computation of a cavity-field-survey (which is necessary in order to update a cavity-bias-survey), the subspace of admissible cavity-fields (where at least one of the boxes has zero warnings) has zero probability. In such a case one can adapt the algorithm, using a penalty function: the probability is not projected but instead it is multiplied by a penalty term smaller than one, and then normalized.

A cavity-field is a set of integers (one for each box corresponding to a possible assignment of the variable). For a given cavity-field, the penalty term is a function of the smallest integer, m, in all these boxes. This function f[m] is equal to one for m=0, it is a decreasing function of m. The usual survey propagation method, described before, corresponds to f[m]=0 for m larger or equal to one. A function which gives good results is f[m]=exp(–ym), where y is a parameter which must be adapted for each problem. The use of the penalty term is as follows: the variable considers all the cavity-bias-surveys it receives from all the other constraints to which it is connected. It deduces the joint probability of the total number of warnings received from these constraints in each box (that is for each possible value of the variable). This probability is then multiplied by the penalty function, and then normalized.

For instance consider the computation of the cavity-field-survey by the variable x in FIG. 7a. The variable can be in two states. A cavity-bias from a to x (or from b to x) consists of two boxes, where each box can contain a warning or be empty. A cavity-bias-warning is the corresponding probability, which is a list of four positive numbers, the sum of which equals one. These are given in FIG. 7b, for the two cavity-bias-surveys from a and b to x. A cavity-field from variable x to constraint c has two boxes, each containing an integer in {0, 1, 2} (corresponding to the number of warnings received from a and b). There are nine cavity-fields, and the cavity-field-survey is a set of nine positive real numbers, the sum of which is one. In order to compute this cavity-field survey, one first computes the probability of each cavity-field, then one multiplies it by the corresponding penalty term. The corresponding numbers are then normalized by a global multiplication by a constant C, so that the sum of all these numbers is one. The result is shown in FIG. 7c, where the constant C is equal to C=1/(0.6*0.7*f[1]+0.6*0.3*f[1]+ 0.4*0.7*f[1]+0.4*0.3*f[2]). In difficult problems in which no satisfiable assignment exist, one can run the standard survey propagation, and if it does not converge after a certain number of iterations, run the modified version with a penalty (in practice, one starts with y=100, which means no penalty, and if survey propagation does not converge one turns to y=6; if the survey propagation with penalty function characterized by y=6 still does not converge, one reduces y until it does converge. In practice, reducing y each time by a factor ⅔ is a good strategy). The computation of local-field-surveys uses exactly the same penalty term as in the cavity-field surveys. This procedure with penalty allows to find some assignments with a low number of violated constraints (although this number is not guaranteed to be the smallest possible one).

APPENDIX

In what follows we shall describe in detail the results of the SP algorithm including the decimations steps, over a 3-SAT constraint satisfaction problem composed of 20 variables and 100 clauses. We shall adopt the following notation:

CLAUSES: Sat [s_i s_j s_k ]( i j k ) where s_i=1 if variable $X_{13}$ i appears directed in the clause and s_i=0 if X_i appears negated. The same for (b,X_j) and (c,X_k).

Example: the clause(X_1 v ~X_2 v X_3) is written as Sat[1 0 1]( 1 2 3 ).

SURVEYS: just like simple warnings or messages are sent from clauses to variable, also Surveys propagate from clauses to variables. From clause "a" to its three variables, say i,j,k, we have three surveys giving the probability of the corresponding cavity biases. Boolean variables can take two values, say 0,1, therefore we will have two probabilities associated to the cavity biases p_0(a->i), p_1(a->i) plus the one corresponding to the null warning (saying that no constraint is enforced). The latter quantity will be never listed in that by normalization it always equals 1-p_0(a->i)-p_1(a->i). We shall adopt the following notation for the Surveys outgoing from clause "a": Sat[s_i s_j s_k ] ( i j k ) }(p_0(a ->i),p_1(a->i)), (p_0(a ->i),p_1(a->i)), (p_0(a ->i),p_1(a->i))}

LOCAL FIELDS: local fields give the probability of finding a variable forced to take a given value or to be under-constrained (no warnings received). For each variable X_i we will give the variable index and the triple {Prob [X_i=0],Prob[X_i not forced],Prob[X_i=1]}Example: [1]{0.036401,0.066197,0.897402} means that for variable number 1 we find {Prob[X_1=0]=0.036401,Prob[X_1 not forced]=0.066197,Prob[X__1=0.897402}

DECIMATION: along the computation variables will be fixed to some value (chosen according to their local field). We shall denote that by an arrow.

Example: 1 Sat[1 1 1]{2->1}( 13 ) In clause number 1 (originally SAT[1 1 1]( 1 2 3 )), the second variable has be fixed to "1". The clause now becomes a two clause depending only variable number 1 and 3.

We shall now proceed in giving the complete numerical details of the computation performed by out algorithm in solving a given specific problem.

STEP 0:

INITIAL PROBLEM: 20 Boolean variables have to satisfy the following 100 3- clauses:

0 Sat[1 1 1]( 14 20 18 )
1 Sat[1 1 1]( 12 15 1 )
2 Sat[0 1 0]( 11 4 7 )
3 Sat[1 1 0]( 6 8 15 )
4 Sat[0 0 0]( 10 5 15 )
5 Sat[0 1 0]( 17 13 4 )
6 Sat[1 1 0]( 1 16 3 )
7 Sat[1 0 0]( 20 1 16 )
8 Sat[1 1 1]( 11 7 4 )
9 Sat[1 0 0]( 7 6 15 )
10 Sat[0 0 1]( 10 12 20 )
11 Sat[1 0 1]( 15 4 11 )
12 Sat[1 0 1]( 18 4 6 )
13 Sat[0 1 0]( 4 3 12 )
14 Sat[1 0 0]( 2 7 16 )
15 Sat[0 0 1]( 3 17 4 )
16 Sat[0 0 0]( 5 19 15 )
17 Sat[1 1 0]( 6 13 7 )
18 Sat[0 0 0]( 4 20 7 )
19 Sat[1 0 0]( 6 17 16 )
20 Sat[1 0 1]( 5 15 13 )
21 Sat[1 1 0]( 13 4 15 )
22 Sat[0 1 1]( 12 5 18 )
23 Sat[1 0 0]( 13 11 2 )
24 Sat[1 0 0]( 7 10 20 )
25 Sat[1 0 1]( 9 1 17 )
26 Sat[1 1 0]( 17 16 1 )
27 Sat[1 1 0]( 16 20 8 )
28 Sat[1 0 1]( 18 1 5 )
29 Sat[0 1 1]( 5 13 4 )
30 Sat[1 1 0]( 6 17 14 )

31 Sat[1 0 1]( 5 10 20 )
32 Sat[1 0 0]( 4 5 20 )
33 Sat[1 1 0]( 11 12 2 )
34 Sat[0 1 0]( 7 6 17 )
35 Sat[1 1 0]( 15 1 19 )
36 Sat[0 0 0]( 11 19 10 )
37 Sat[0 1 1]( 3 8 7 )
38 Sat[1 1 0]( 1 6 19 )
39 Sat[1 1 1]( 6 14 3 )
40 Sat[0 1 0]( 3 12 5 )
41 Sat[1 0 0]( 7 11 14 )
42 Sat[1 1 1]( 4 18 7 )
43 Sat[0 0 1]( 14 11 19 )
44 Sat[0 1 1]( 15 5 6 )
45 Sat[1 0 0]( 3 15 9 )
46 Sat[1 0 0]( 8 5 4 )
47 Sat[0 0 0]( 7 5 3 )
48 Sat[0 0 1]( 15 7 13 )
49 Sat[0 1 1]( 16 5 7 )
50 Sat[1 1 1]( 8 7 10 )
51 Sat[1 1 1]( 6 10 13 )
52 Sat[0 1 1]( 8 15 10 )
53 Sat[1 1 1]( 17 9 18 )
54 Sat[1 0 0]( 19 1 16 )
55 Sat[1 0 1]( 14 5 16 )
56 Sat[1 1 1]( 15 2 14 )
57 Sat[1 1 1]( 4 19 15 )
58 Sat[0 1 0]( 17 18 15 )
59 Sat[0 1 1]( 9 11 1 )
60 Sat[1 1 0]( 6 20 14 )
61 Sat[0 1 1]( 7 5 19 )
62 Sat[0 0 1]( 12 19 16 )
63 Sat[1 0 0]( 19 6 17 )
64 Sat[1 1 0]( 13 11 7 )
65 Sat[0 1 0]( 9 18 1 )
66 Sat[0 0 0]( 17 19 14 )
67 Sat[1 1 1]( 17 9 18 )
68 Sat[1 0 0]( 8 4 18 )
69 Sat[1 0 0]( 14 16 11 )
70 Sat[1 0 1]( 15 19 13 )
71 Sat[0 1 1]( 14 7 8 )
72 Sat[0 0 0]( 5 11 19 )
73 Sat[0 1 1]( 12 13 17 )
74 Sat[0 0 0]( 3 20 7 )
75 Sat[0 1 1]( 4 19 12 )
76 Sat[1 0 0]( 12 1 11 )
77 Sat[1 0 1]( 16 10 2 )
78 Sat[1 1 0]( 13 1 9 )
79 Sat[1 0 0]( 6 10 11 )
80 Sat[1 1 1]( 6 2 16 )
81 Sat[0 1 1]( 10 5 8 )
82 Sat[0 0 0]( 6 16 3 )
83 Sat[0 1 1]( 9 3 1 )
84 Sat[1 1 1]( 17 14 8 )
85 Sat[0 0 0]( 12 15 11 )
86 Sat[0 1 1]( 8 3 18 )
87 Sat[0 0 1]( 15 2 19 )
88 Sat[0 1 1]( 7 19 5 )
89 Sat[1 0 1]( 4 11 10 )
90 Sat[1 0 1]( 17 12 8 )
91 Sat[0 1 1]( 4 8 6 )
92 Sat[1 1 0]( 6 12 3 )
93 Sat[1 0 0]( 16 7 17 )
94 Sat[0 1 1]( 15 13 20 )
95 Sat[0 1 1]( 18 11 16 )
96 Sat[1 1 1]( 8 2 17 )
97 Sat[0 1 0]( 13 11 19 )
98 Sat[0 0 1]( 4 19 9 )
99 Sat[1 0 0]( 15 9 13 )

Surveys obtained by convergence of SP:
Sat[1 1 1]( 14 20 18 ) {(0.000341,0.000000)(0.000250, 0.000000)(0.161406,0.000000)}
Sat[1 1 1]( 12 15 1 ) {(0.366268,0.000000)(0.456078, 0.000000)(0.199041,0.000000)}
Sat[0 1 0]( 11 4 7 ) {(0.000000,0.370421)(0.184106, 0.000000)(0.000000,0.184764)}
Sat[1 1 0]( 6 8 15 ) {(0.64017,0.000000)(0.181798, 0.000000)(0.000000,022080)}
Sat[0 0 0]( 10 5 15 ) {(0.000000,0.617518)(0.000000, 0.352673)(0.000000,0.342351)}
Sat[0 1 0]( 17 13 4 ) {(0.000000,0.010877)(0.047850, 0.000000)(0.000000,0.003192)}
Sat[1 1 0]( 1 16 3 ) {(0.050351,0.000000)(0.128653, 0.000000)(0.000000,0.318466)}
Sat[1 0 0]( 20 1 16 ) {(0.029869,0.000000)(0.000000, 0.284175)(0.000000,0.023908)}
Sat[1 1 1]( 11 7 4 ) {(0.491835,0.000000)(0.635059, 0.000000)(0.563177,0.000000)}
Sat[1 0 0]( 7 6 15 ) {(0.765622,0.000000)(0.000000, 0.662941)(0.000000,0.652725)}
Sat[0 1 1]( 15 13 20 ) {(0.000000,0.018448)(0.345575, 0.000000)(0.028081,0.000000)}
Sat[1 0 1]( 18 11 16 ) {(0.069273,0.000000)(0.000000, 0.000211)(0.000141,0.000000)}
Sat[1 1 1](8 2 17 ) {(0.477790,0.000000)(0.097216, 0.000000)(0.085097,0.000000)}
Sat[0 1 0]( 13 11 19 ) {(0.000000,0.469933)(0.528990, 0.000000)(0.000000,0.836465)}
Sat[0 0 1]( 4 19 9 ) {(0.000000,0.259595)(0.000000, 0.463005)(0.127525,0.000000)}
Sat[1 0 0]( 15 9 13 ) {(0.008740,0.000000)(0.000000, 0.253115)(0.000000,0.002474)}

Local fields:
[1]{0.036401,0.066197,0.897402 }
[2]{0.289026,0.087968,0.623006 }
[3]{0.101837,0.090140,0.808023 }
[4]{0.403023,0.036656,0.560321 }
[5]{0.689450,0.058805,0.251745 }
[6]{0.689499,0.072289,0.238212 }
[7]{0.557957,0.026921,0.415122 }
[8]{0.893026,0.033652,0.073322 }
[9]{0.006920,0.026377,0.966703 }
[10]{0.232639,0.102904,0.664458 }
[11]{0.214896,0.038727,0.746377 }
[12]{0.495796,0.118351,0.385853 }
[13]{0.945504,0.028815,0.025681 }
[14]{0.450554,0.205685,0.343762 }
[15]{0.721522,0.012500,0.265978 }
[16]{0.589983,0.087746,0.322271 }
[17]{0.117364,0.161353,0.721284 }
[18]{0.988484,0.010907,0.000609 }
[19]{0.163911,0.010184,0.825905 }
[20]{0.363102,0.167461,0.469437 }

STEP 1:
fixing var 18 to 1. (local field: [18]{0.988484,0.010907, 0.000609 })

Clauses in which var 18 appears:
0 Sat[1 1 1]( 14 20 18 )
12 Sat[1 0 1]( 18 4 6 )
22 Sat[0 1 1]( 12 5 18 )
28 Sat[1 0 1]( 18 1 5 )
42 Sat[1 1 1]( 4 18 7 )

53 Sat[1 1 1]( 17 9 18 )
58 Sat[0 1 0]( 17 18 15 )
65 Sat[0 1 0]( 9 18 1 )
67 Sat[1 1 1]( 17 9 18 )
68 Sat[1 0 0]( 8 4 18 )
86 Sat[0 1 1]( 8 3 18 )
95 Sat[1 0 1]( 18 11 16 )

The clauses in which s_18=1 are satisfied and eliminated.
New surveys obtained by convergence of SP:

Sat[1 1 1[{2->1}]( 14 20 ) {(0.000000,0.000000)(0.000000,0.000000)}
Sat[1 1 1]( 12 15 1 ) {(0.365819,0.000000)(0.455933,0.000000)(0.198635,0.000000)}
Sat[0 1 0]( 11 4 7 ) {(0.000000,0.370274)(0.183870,0.000000)(0.000000,0.184538)}
Sat[1 1 0]( 6 8 15 ) {(0.063481,0.000000)(0.181894,0.000000)(0.000000,0.021884)}
Sat[0 0 0]( 10 5 15 ) {(0.000000,0.618018)(0.000000,0.353109)(0.000000,0.342691)}
Sat[0 1 0]( 17 13 4 ) {(0.000000,0.010839)(0.047374,0.000000)(0.000000,0.003150)}
Sat[1 1 0]( 1 16 3 ) {(0.050197,0.000000)(0.128356,0.000000)(0.000000,0.318430)}
Sat[1 0 0[( 20 1 16 ) {(0.029687,0.000000)(0.000000,0.284156)(0.000000,0.023759)}
Sat[1 1 1]( 11 7 4 ) {(0.492176,0.000000)(0.635354,0.000000)(0.563572,0.000000)}
Sat[1 0 0]( 7 6 15 ) {(0.765815,0.000000)(0.000000,0.663336)(0.000000,0.652883)}
Sat[0 0 1]( 10 12 20 ) {(0.000000,0.274938)(0.000000,0.151084)(0.158223,0.000000)}
Sat[1 0 1]( 15 4 11 ) {(0.380704,0.000000)(0.000000,0.288286)(0.179415,0.000000)}
Sat[1 0 1]{0->1}( 4 6 ) {(0.000000,0.000000)(0.000000,0.000000)}
Sat[0 1 0]( 4 3 12 ) {(0.000000,0.608621)(0.436792,0.000000)(0.000000,0.558341)}
Sat[1 0 0]( 2 7 16 ) {(0.627547,0.000000)(0.000000,0.653203)(0.000000,0.640348)}
Sat[0 0 1]( 3 17 4 ) {(0.000000,0.069231)(0.000000,0.061041)(0.013303,0.000000)}

The invention claimed is:

1. A system, comprising:
a memory storing a problem;
a processor coupled to the memory, the processor comprising:
means for constructing a data structure representative of the problem, the data structure comprising constrained discrete variables of the problem and constraints of the variables, each variable having a referenced set of possible states;
means for delivering messages between a variable of the variables and at least one constraint of the variable, the messages comprising a message containing a set of probabilities for various patterns of warning for the variable, a warning giving information on whether the various assignments from the set of possible states of the variable are compatible with the constraints involving the variable;
means for calculating a probability of the variable satisfying the at least one constraint of the variable based on the messages delivered in order to compute a degree of polarization of the variable to know to what degree the most favorable assignment of the variable is better than all other possible assignments of the variable;
means for assigning at least one of the variable a state from its set of possible states according to the computed degrees of polarization, for simplifying the problem;
means for recursively using means for constructing the data structure, delivering messages, calculating probabilities, and assigning until at least all the variables have been assigned for providing a solution to the problem; and
an output device coupled to the processor, the output device outputting the solution of the problem.

2. The system of claim 1, the data structure comprising a graph with nodes.

3. The system of claim 1, the data structure comprising a list.

4. The system of claim 1, the messages comprising a list of binary number equaling the number of possible states of the variable.

5. The system of claim 4, the list comprising $2^q$ entries, q equaling the number of possible states for the variable.

6. The system of claim 1, the means for delivering comprising sending warning messages from the at least one constraint to the variable.

7. The system of claim 1, the means for delivering comprising sending void messages from the at least one constraint to a corresponding variable and indicating that a state of the variable is compatible with the at least one constraint.

8. The system of claim 1, the means for delivering comprising sending an integer value from the variable to the at least one corresponding constraint.

9. The system of claim 8, the messages comprising a list of integer values related to a variable, the list of integer values equaling the number of possible states of the variable and each integer value totaling the number of warning messages received by the variable from other corresponding constraints.

10. The system of claim 8, the messages comprising a list of integer values related to the variable, the list of integer values equaling the number of possible states of the variable, and each integer value totaling the number of void messages received by the variable from other corresponding constraint, a void message indicating that a state of a variable is compatible with the at least one constraint.

11. The system of claim 1, further comprising means for arranging the variables of the problem and the constraints into a truth table to determine a possible state for each variable.

12. The system of claim 1, further comprising means for constructing a look-up table comprising the constraints and the variables to determine if the constraints are satisfied.

13. The system of claim 12, further comprising means for updating the look-up table to determine a probability that the constraints will not be satisfied for each state of the variables.

14. The system of claim 1, further comprising means for assigning a state to the variable when all constraints of the variable is reduced or satisfied.

15. The system of claim 1, further comprising means for implementing a penalty function if the variables do not satisfy any constraints, the penalty function determining a probability of satisfying all constraints of each variable in a given state.

16. The system of claim 1, further comprising means for randomly choosing a constraint and a corresponding variable to begin solving the problem.

17. The system of claim 1, further comprising means for choosing one variable and all corresponding constraints to begin solving the problem.

18. The system of claim 1, the processor further comprising:
(a) means for a determining a survey propagation in which the data structure of the problem is constructed and messages are delivered;
(b) means for determining a survey induced decimation in which, using the previous messages, a degree of polarization for a variable being computed by first establishing a list of numbers, each one giving how favorable it is to assign the variable to one state of its set of possible states, each of these numbers being computed from the probability of warnings determined in the previous messages, the list being used to compute the degree of polarization by determining to what degree the most favorable assignment in the list is better than all other possible assignments, and at least one of the variables is assigned one state of its set of possible states according to its degree of polarization as to simplify the problem; and
(c) means for restarting from step (a) with a new simplified problem until all variables are either assigned or are unpolarized.

19. The system of claim 18, (a) the means for survey propagation comprising:
determining from a modelization of the problem, an interaction graph with edges linking nodes, the nodes having the variables, $S_1$, $S_2$, $S_3$, to $Sn$, and the constraints, a, b, c, d, . . . , a variable node being connected by an edge to its related constraint(s), an interaction graph being bipartite, a variable being connected only to constraints, a constraint being connected only to variables, and for each constraint which is linked to a variable, updating the graph by:
determining over the graph, first a list of elementary messages called cavity-bias sent from each constraint to its related variable, the cavity-bias being a message having a number of binary items equal to the number of possible states of the variable to which it is sent, each binary item being either void or non-void, the void corresponding to an absence of constraint on the corresponding state of the variable and the non-void corresponding to the reverse, the cavity biases being initialized to random values;
determining over the graph, a list of second elementary messages called cavity-fields sent from each variable to its related constraints, the cavity-field being a message having a number of integer items equal to the number of possible states of the variable which sends it, each integer item value being the number of non-void received from all cavity-biases to the variable for the referenced possible state of the variable;
determining over the graph, a list of local-fields which are sets of integer values in relation to variables, each local-field being a set having a number of integer values equal to the number of possible states of the variable and each integer value being the number of non-void received by the variable in cavity-biases for each possible state of the variable;
the cavity-bias sent from a constraint a to a variable S being computed on the constraint a from at least one cavity-field received by the constraint a from all the other variables to which the constraint a is linked, thus excluding S, and, for each of the cavity-fields, the least penalized subspace of possible states of the variable is determined as being a set of the references of possible states for which the number of non-void is minimal, then a truth table restricted to the sets for all the cavity-fields and for all the references of possible states for the variable S is created in relation to the constraint a, from this restricted truth table a void is assigned in the cavity-bias for the referenced possible state of the variable S if the constraint is satisfied and a non-void if the constraint is not satisfied;
determining over the graph, probability laws of each cavity-bias sent from the constraint a to a linked variable S with q possible states and called cavity-bias-surveys, a cavity-bias-survey being a set of 2 a probabilities for each possible configuration of its cavity-bias;
determining over the graph, probability laws of each cavity-field sent from the variable S to a linked constraint a and called cavity-field-surveys, a cavity-field-survey being a set of probabilities for each admissible configuration of its cavity-field, an admissible configuration of cavity-field being one with at least one void;
the cavity-bias-survey sent from the constraint a to the variable S being computed on the constraint a from at least one cavity-field-survey received by the constraint a from all the other variables to which the constraint a is linked, thus excluding the variable S, by using a look-up table characterizing constraint a, the look-up table being a list giving, for each possible assignment of all variables participating to the constraint, whether the constraint is satisfied by the assignment or not, and computing the probability that the constraint is unsatisfied, for each state of the variable;
previous survey propagation steps updates being run successively on the constraints and variables along the graph,
the updates being stopped after a predetermined number of updates if it is not possible to find a set of cavity-bias-surveys which does not change, when one round of updates on all constraints and on all variables participating to the constraints is performed within a given pre-assigned resolution and, then, being restarted from the beginning with cavity biases initialized to new random values;

(b) the means for survey induced decimation comprising:
determining over the graph, a local-field-survey for each variable which is a probability law of all possible local-field by computing for each variable S from all the cavity-bias-surveys received by the variable and for each possible state of the variable the joint probability of each admissible local-field, an admissible local-field being one with at least one zero value, and with the previously determined local-field-surveys;
determining the degree of polarization of each variable by computing, for each assignment of the variable, the probability of having zero value as given by the local-field-survey, and computing for each assignment of the variable, the maximum of this probability diminished by the sum of the probabilities for all other assignments;
where the variable with the largest degree of polarization is assigned to its preferred state, the one with the largest probability of having zero value as given by the local-field-survey;

where the constraints containing this assigned variable are reduced, those which are satisfied are eliminated, in order to make a simpler new problem; and (c) the means for restarting comprising:
restarting from survey propagation steps (a) with the new problem until all variables are assigned or are unpolarized such that for all the possible assignments of the variable, the probabilities of having zero value as given by the local-field-survey, diminished by the sum of the probabilities of having zero value as given by the local-field-survey for all other assignments, are equal within a predetermined resolution.

20. A method for solving a problem, comprising:
constructing, in constructing means, a data structure representative of the problem comprising a set of discrete variables, each variable of the set having a referenced set of possible states, each variable of the set having at least one corresponding constraint;
delivering, in delivering means, messages between a variable of the set of variables and the at least one corresponding constraint, messages comprising a message containing a set of probabilities for various patterns of warning for a variable, a warning giving information on whether various assignments from the set of possible states of the variable are compatible with the constraints involving the variable;
calculating, in calculating means, a set of numbers dependent on the messages, each number in the set of numbers representing a probability of satisfying all constraints of the variable in a given state in order to compute a degree of polarization of the variable to know to what degree the most favorable assignment of the variable is better than all other possible assignment of the variable;
assigning, in assigning means, at least one of the variable a state from its set of possible states according to the computed degrees of polarization, for simplifying the problem; and
recursively using means for constructing the data structure, delivering messages, calculating probabilities and assigning until at least all the variables have been assigned as to provide a solution to the problem.

21. The method of claim 20, the data structure comprising a graph with nodes.

22. The method of claim 20, the data structure comprising a list.

23. The method of claim 20, the messages comprising a list of binary number equaling the number of possible states of the variable.

24. The method of claim 23, the list comprising $2^q$ entries, q equaling the number of states for the variable.

25. The method of claim 20, the delivering means comprising sending warning messages from the at least one constraint to the variable.

26. The method of claim 20, the delivering means comprising sending void messages from the at least one constraint to the variable and indicating that a state of the variable is compatible with the at least one constraint.

27. The method of claim 20, the delivering means comprising sending an integer value from the variable to the at least one corresponding constraint.

28. The method of claim 27, the messages comprising a list of integer values related to the variable, the list of integer values equaling the number of possible states of the variable and each integer value totaling the number of warning messages received by the variable from other corresponding constraints.

29. The method of claim 27, the messages comprising a list of integer values related to the variable, the list of integer values equaling the number of possible states of the variable, and each integer value totaling the number of void messages received by the variable from other corresponding constraint, a void message indicating that a state of a variable is compatible with the at least one constraint.

30. The method of claim 20, the set of numbers equaling the number of possible states of the variable.

31. The method of claim 20, further comprising arranging in arranging means each variable of the set of variables and the at least one constraint into a truth table to determine a possible state for each variable.

32. The method of claim 20, further comprising constructing in constructing means a look-up table comprising the at least one constraint and all variables associated with the at least one constraint to determine if the at least constraint is satisfied.

33. The method of claim 32, further comprising updating in updating means the look-up table to determine a probability that the at least one constraint will not be satisfied for each state of all variables associated with the at least one constraint.

34. The method of claim 20, further comprising assigning in assigning means a state to the variable when all constraints of the variable is reduced or satisfied.

35. The method of claim 20, further comprising implementing in implementing means a penalty function if each variable in the set of variables does not satisfy any constraints, the penalty function determining a probability of satisfying all constraints of each variable in a given state.

36. The method of claim 20, prior to the step of delivering, randomly choosing in a choosing means a constraint and a corresponding variable to begin solving the problem.

37. The method of claim 20, prior to the step of delivering, choosing in a choosing means one variable and all corresponding constraints to begin solving the problem.

38. A computer program, comprising computer or machine-readable program elements translatable for implementing the method of claim 20.

39. The method of claim 20, further comprising:
implementing in implementing means a cavity-bias survey, the cavity-bias survey sending in sending means messages from a constraint to a corresponding variable to determine if the corresponding variable satisfies the constraint;
implementing in implementing means a cavity-field survey, the cavity-field survey sending in sending means messages from the corresponding variable to the constraint to determine if the variable satisfy other constraints related to the variable;
solving in solving means a probability if a given state of the variable satisfy the constraint based on the messages; and
assigning in assigning means a state to the variable from the probability to solve the problem.

40. The method of claim 20, further comprising providing:
(a) a survey propagation in which the data structure of the problem is constructed and messages are delivered,
(b) a survey induced decimation in which, using the previous messages, a degree of polarization for a variable being computed by first establishing a list of numbers, each one giving how favorable it is to assign the variable to one state of its set of possible states, each of these numbers being computed from the probability of warnings determined in the previous messages, the list being used to compute the degree of polarization by determining to what degree the most favorable assignment in the list is better than all other possible assignments, and at least one of the variables is assigned one state of its set of possible states according to its degree of polarization as to simplify the problem, (c) an iteration for restarting from step (a) with the new simplified problem till all variables are either assigned or are unpolarized.

41. The method of claim 40, (a) the survey propagation comprising:

determining from a modelization of the problem, an interaction graph with edges linking nodes, the nodes being the variables, $S_1, S_2, S_3 \ldots$, and the constraints, a, b, c, d . . . , a variable node being connected by an edge to its related constraint(s), an interaction graph being bipartite, a variable being connected only to constraints, a constraint being connected only to variables, and for each constraint which is linked to a variable, updating the graph by:

determining over the graph, first a list of elementary messages called cavity-bias sent from each constraint to its related variable, the cavity bias being a message having a number of binary items equal to the number of possible states of the variable to which it is sent, each binary item being either void or non-void, the void corresponding to an absence of constraint on the corresponding state of the variable and the non-void corresponding to the reverse, the cavity biases being initialized to random values;

determining over the graph, a list of second elementary messages called cavity-fields sent from each variable to its related constraints, the cavity-field being a message having a number of integer items equal to the number of possible states of the variable which sends it, each integer item value being the number of non-void received from all cavity-biases to the variable for the referenced possible state of the variable;

determining over the graph, a list of local-fields which are sets of integer values in relation to variables, each local-field being a set having a number of integer values equal to the number of possible states of the variable and each integer value being the number of non-void received by the variable in cavity-biases for each possible state of the variable;

the cavity-bias sent from the constraint a to the variable S being computed on the constraint a from the cavity-field(s) received by the constraint a from all the other variables to which the constraint a is linked, thus excluding the variable S, and, for each of the cavity-fields, the least penalized subspace of possible states of the variable is determined as being a set of the references of possible states for which the number of non-void is minimal, then a truth table restricted to the sets for all the cavity-fields and for all the references of possible states for the variable S is created in relation to the constraint a, from this restricted truth table a void is assigned in the cavity-bias for the referenced possible state of the variable S if the constraint is satisfied and a non-void if the constraint is not satisfied;

determining over the graph, probability laws of each cavity-bias sent from the constraint a to a linked variable S with q possible states and called cavity-bias-surveys, a cavity-bias-survey being a set of $2^q$ probabilities for each possible configuration of its cavity-bias;

determining over the graph, probability laws of each cavity-field sent from the variable S to a linked constraint a and called cavity-field-surveys, a cavity-field-survey being a set of probabilities for each admissible configuration of its cavity-field, an admissible configuration of cavity-field being one with at least one void;

the cavity-bias-survey sent from the constraint a to the variable S being computed on the constraint a from at least one cavity-field-survey received by the constraint a from all the other variables to which the constraint a is linked, thus excluding the variable S, by using a look-up table characterizing constraint a, the look-up table being a list giving, for each possible assignment of all variables participating to the constraint, whether the constraint is satisfied by the assignment or not, and computing the probability that the constraint is unsatisfied, for each state of the variable, previous survey propagation steps updates being run successively on the constraints and variables along the graph, the updates being stopped after a predetermined number of updates if it is not possible to find a set of cavity-bias-surveys which does not change, when one round of updates on all constraints and on all variables participating to the constraints is performed within a given preassigned resolution and, then, being restarted from the beginning with cavity biases initialized to new random values, (b) the survey induced decimation comprising:

determining over the graph, a local-field-survey for each variable which is a probability law of all possible local-field by computing for each variable S from all the cavity-bias-surveys received by the variable and for each possible state of the variable the joint probability of each admissible local-field, an admissible local-field being one with at least one zero value, and with the previously determined local-field-surveys:

determining the degree of polarization of each variable by computing, for each assignment of the variable, the probability of having zero value as given by the local-field-survey, and computing for each assignment of the variable, the maximum of this probability diminished by the sum of the probabilities for all other assignments;

where the variable with the largest degree of polarization is assigned to its preferred state, the one with the largest probability of having zero value as given by the local-field-survey;

where the constraints containing this assigned variable are reduced, those which are satisfied are eliminated, in order to make a simpler new problem; and (c) the iteration comprising:

restarting from survey propagation steps (a) with the new problem until all variables are assigned or are unpolarized such that, for all the possible assignments of the variable, the probabilities of having zero value as given by the local-field-survey, diminished by the sum of the probabilities of having zero value as given by the local-field-survey for all other assignments, are equal within a predetermined resolution.

42. A program storage device readable by a machine, tangibly embodying a program of instructions executable by the machine to perform the method for solving a problem, the method steps comprising:

constructing, in constructing means, a data structure representative of the problem comprising a set of discrete variables, each variable of the set having a referenced set of possible states, each variable of the set having at least one corresponding constraint;

delivering, in delivering means, messages between a variable of the set of variables and the at least one corresponding constraint, messages comprising a message containing a set of probabilities for various patterns of warning for the variable, a warning giving information on whether the various assignments from the set of possible states of the variable compatible with the constraints involving the variable; and calculating, in calculating means, a set of numbers dependent on the messages, each number in the set of numbers representing a probability of satisfying all constraints of the variable in a given state as to compute a degree of polarization of the variable to know to what degree the most favorable assignment of the variable is better than all other possible assignments of the variable;

assigning, in assigning means, at least one of the variable a state from its set of possible states according to the computed degrees of polarization for simplifying the problem; and recursively using means for constructing the data structure, delivering messages, calculating probabilities and assigning until at least all the variables have been assigned as to provide a solution to the problem.

* * * * *

UNITED STATES PATENT AND TRADEMARK OFFICE
CERTIFICATE OF CORRECTION

PATENT NO. : 7,036,720 B2
APPLICATION NO. : 10/606275
DATED : May 2, 2006
INVENTOR(S) : Mezard et al.

It is certified that error appears in the above-identified patent and that said Letters Patent is hereby corrected as shown below:

column 28, lines 14,15 delete "set of 2 a probabilities" and insert --set of $2^q$ probabilities---therefor.

Signed and Sealed this

Eighth Day of August, 2006

JON W. DUDAS
*Director of the United States Patent and Trademark Office*